United States Patent [19]

Nara et al.

[11] Patent Number: 5,515,171
[45] Date of Patent: May 7, 1996

[54] REMOTE-CONTROLLED COPYING APPARATUS HAVING FACSIMILE INTERFACE UNIT

[75] Inventors: Wataru Nara, Kawasaki; Midori Aida; Hajime Hojo, both of Yokohama; Kunio Hayakawa; Yutaka Hasegawa, both of Tokyo, all of Japan

[73] Assignee: Ricoh Company, Ltd., Tokyo, Japan

[21] Appl. No.: 22,297

[22] Filed: Feb. 25, 1993

[30] Foreign Application Priority Data

Feb. 28, 1992 [JP] Japan ..................... 4-043297

[51] Int. Cl.⁶ .............. H04N 1/32; H04N 1/00; G03G 21/00; H04M 11/00
[52] U.S. Cl. .......... 358/296; 358/407; 358/438; 358/468; 355/204; 379/102
[58] Field of Search ............ 358/296, 401–403, 358/407, 434, 435, 438, 439, 442, 468; 355/202, 204; 379/97, 102, 104, 105, 106

[56] References Cited

U.S. PATENT DOCUMENTS

| 4,519,695 | 5/1985 | Murai et al. ............. 355/14 R |
| 4,539,279 | 9/1985 | Murai et al. ............. 355/14 D |
| 4,572,654 | 2/1986 | Murai et al. ............. 355/14 D |
| 4,845,773 | 7/1989 | Attallah ..................... 379/102 |
| 4,965,637 | 10/1990 | Katoh et al. ............. 355/204 X |
| 5,021,892 | 6/1991 | Kita et al. ............... 358/468 |
| 5,093,857 | 3/1992 | Yoshida et al. ............ 358/438 X |
| 5,175,760 | 12/1992 | Ohashi et al. ............ 358/407 X |
| 5,189,693 | 2/1993 | Nakajima ............... 358/442 X |
| 5,216,461 | 6/1993 | Maekawa et al. .......... 355/202 |
| 5,216,517 | 6/1993 | Kinoshita et al. ......... 358/407 X |
| 5,216,706 | 6/1993 | Nakajima ............... 379/102 X |

OTHER PUBLICATIONS

U.S. patent application Ser. No. 08/022,297, filed Feb. 25, 1993, pending.

Primary Examiner—Peter S. Wong
Assistant Examiner—Eric Frahm
Attorney, Agent, or Firm—Oblon, Spivak, McClelland, Maier & Neustadt

[57] ABSTRACT

A remote-controlled copying apparatus includes a main copying part, a storage unit for storing image signals from the main copying part, a facsimile part connected to a first telephone line for receiving image signals from an external facsimile unit and for transmitting the image signals of the storage unit to an external facsimile unit, a facsimile control part connected to a second telephone line for receiving a first tone signal from an external telephone unit after a ringing signal is received from the external telephone unit, and for repeatedly transmitting a set of control signals to the external telephone unit in response to the first tone signal, a first conversion part for converting a tone signal into a control signal so that the control signal is transmitted to the external telephone unit, a second conversion part for converting a control signal into a tone signal, and a control part for carrying out a remote control operation of the copying apparatus by controlling the facsimile control part in accordance with a tone signal received from the external telephone unit.

8 Claims, 23 Drawing Sheets

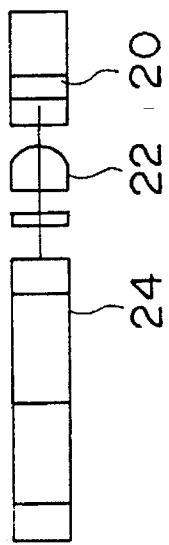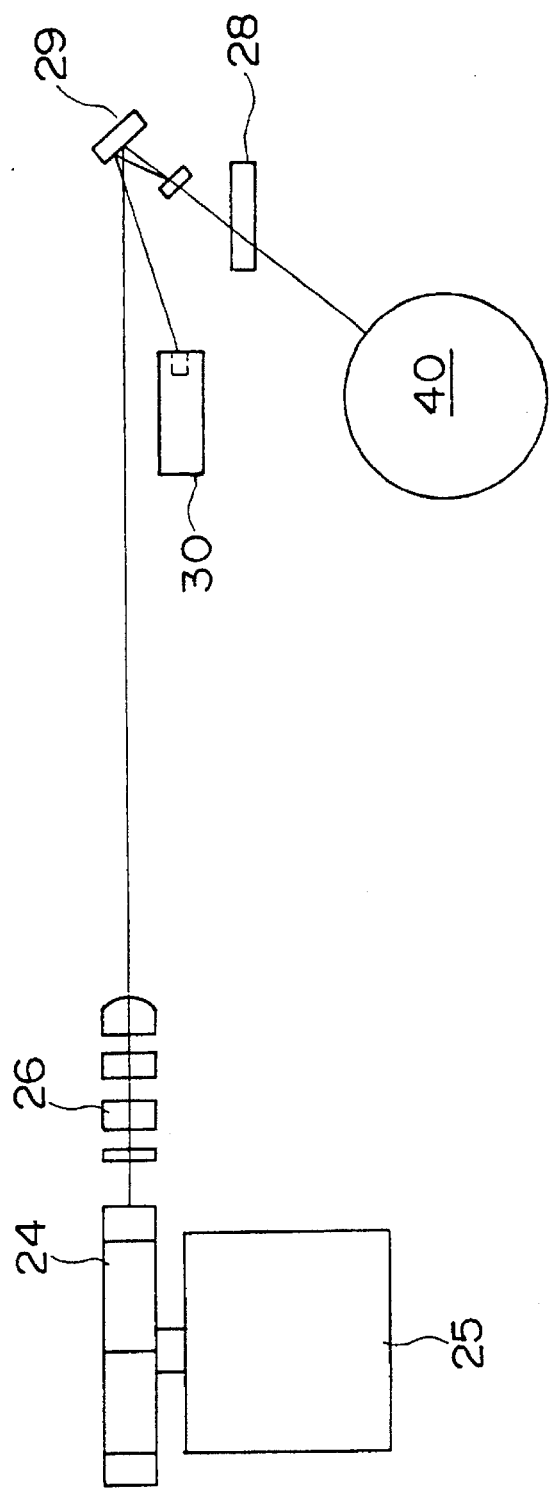

F I G. 14
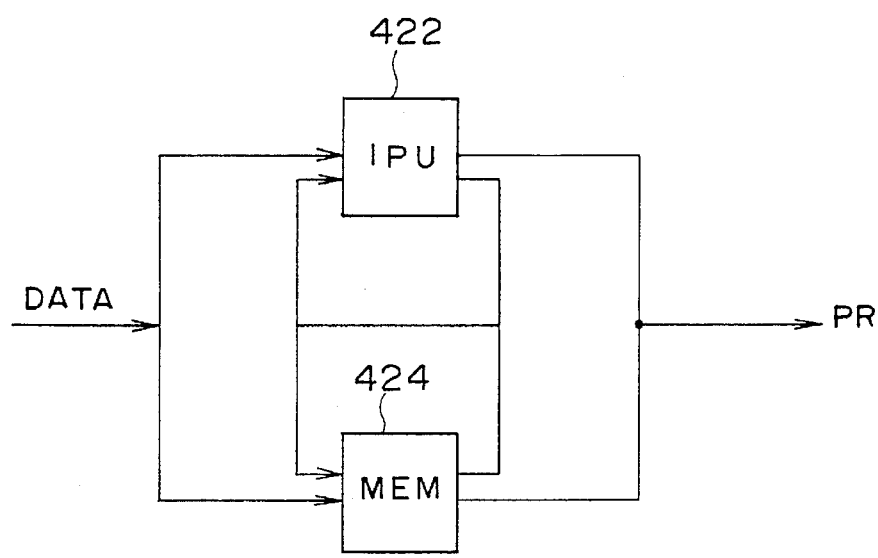
F I G. 15
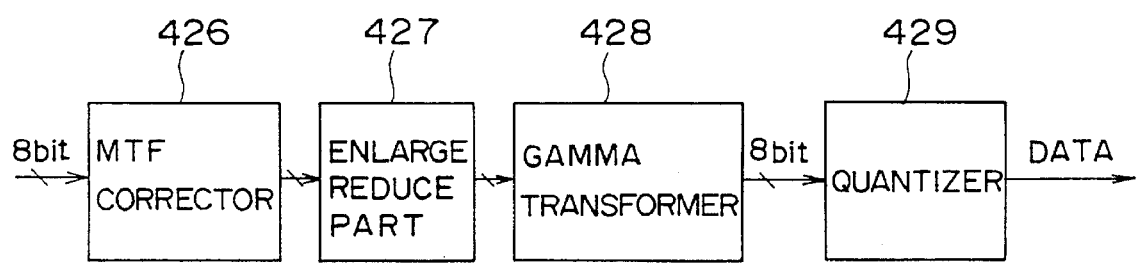

F I G. 28

(a)

110 #45* #67* # 001**

(b)

110 #45* #67* #7111* #01*

001**

(c)

110 #45* #67* ##* #7111*

01* # 001**

(d)

110 #45#46* #67* # 001**

(e)

110 #45* #### #46* #67* #**

001

REMOTE-CONTROLLED COPYING APPARATUS HAVING FACSIMILE INTERFACE UNIT

BACKGROUND OF THE INVENTION

The present invention generally relates to a remote-controlled copying apparatus, and more particularly to a remote-controlled copying apparatus having a facsimile interface unit in which the operations of the apparatus are remote controlled from a remote telephone unit via a telephone line.

In digital copying machines, an image signal is read from a document by a reading unit, and the image signal is processed to produce a recording signal. A laser diode of a recording unit is driven in accordance with the recording signal to emit a laser light, so that an image of the document is reproduced on a photosensitive medium by the laser light from the laser diode.

In the digital copying machine described above, the reading unit for reading an image signal from a document and the recording unit for recording an image of the document are separate function units each of which units can be operated independently. It has been proposed to combine one of such function units with an external system so that the external system can have the function of the connected unit.

Currently, there is a telephone system in which a voice from a receiver of the telephone system is recorded and a signal of the recorded voice is sent to an external unit via a telephone line. With recent development of telephone systems, it is possible to perform automatic operations of electric units at home by using a telephone unit at a remote location when the user is absent from home.

Usually, a high-performance, multi-function digital copying machine installed in a business office is shared by many office workers. Thus, when the digital copying machine is being operated by some office workers, others must wait until the digital copying machine is in an "not in use" condition.

Therefore, when the digital copying machine is being continuously operated, it is desirable for other users to make a call to the machine from a remote telephone unit (for example, an extension telephone system of the office), so that a desired operation of the machine is performed in a remote control procedure after the digital copying machine becomes in the "not in use" condition. However, it is difficult for the conventional digital copying machine to reliably carry out the above described remote-control procedure without experiencing difficulties.

SUMMARY OF THE INVENTION

Accordingly, it is a general object of the present invention to provide an improved copying apparatus in which the above described problems are eliminated.

Another, more specific object of the present invention is to provide a remote-controlled copying apparatus having a facsimile interface unit for transmitting and receiving image data via a telephone line in which apparatus a remote control procedure thereof can be reliably carried out without operation difficulties. The above mentioned objects of the present invention are achieved by a remote-controlled copying apparatus which includes: a main copying part having a scanner unit, an image processor, and a printing unit; a storage unit for storing the processed image signals from the image processor of the main copying part; a facsimile part connected to a first telephone line for receiving image signals from an external facsimile unit via the first telephone line and for transmitting the processed image signals of the storage unit to an external facsimile unit via the first telephone line; a facsimile control part connected to a second telephone line for receiving a first tone signal from an external telephone unit via the second telephone line after a ringing signal is received from the external telephone unit, and for repeatedly transmitting a set of control signals to the external telephone unit via the second telephone line in response to the received first tone signal; a first conversion part for converting a tone signal, received by the facsimile control part from the external telephone unit, into a control signal so that the control signal of the first conversion part is transmitted by the facsimile control part to the external telephone unit; a second conversion part for converting a control signal from the first conversion part into a tone signal; and a control part for carrying out a remote control operation of the copying apparatus by controlling the facsimile control part in accordance with a tone signal received from the external telephone unit. In this copying apparatus, when a second tone signal, requesting a start of a remote control operation of the copying apparatus, is received from the external telephone unit during repeated transmission of control signals to the external telephone unit by the facsimile control part, the control part allows the facsimile control part to transmit at least one of the control signals to the external telephone unit. Also, in this copying apparatus, a protocol signal indicating reception of the second tone signal at the facsimile control part is transmitted to the external telephone unit by the facsimile control part after the above mentioned control signal(s) are transmitted to the external telephone unit.

In the remote-controlled copying apparatus according to the present invention, it is possible to reliably carry out a remote control procedure of the copying apparatus even when a tone signal is received from the telephone unit during the repeated transmission of control signal from the apparatus back to the telephone unit. Also, in the remote-controlled copying apparatus according to the present invention, it is possible for the users to perform simple input operations at a remote telephone unit when it is needed to perform a remote control procedure for the digital copying machine having the facsimile interface unit.

Other objects and further features of the present invention will become apparent from the following detailed description when read in conjunction with the accompanying drawings.

BRIEF DESCRIPTION OF THE DRAWINGS

FIGS. 8A and 8B are sectional views showing an optical system of the recording unit shown in FIG. 7;

FIG. 14 is a diagram showing a data flow of an image processing performed by the main image processor shown in FIG. 13;

FIG. 15 is a block diagram showing an image processing unit of the main image processor shown in FIG. 13;

FIG. 28 is a diagram showing several examples of control signals received at the facsimile unit from an external telephone unit.

DESCRIPTION OF THE PREFERRED EMBODIMENTS

Figure 6:
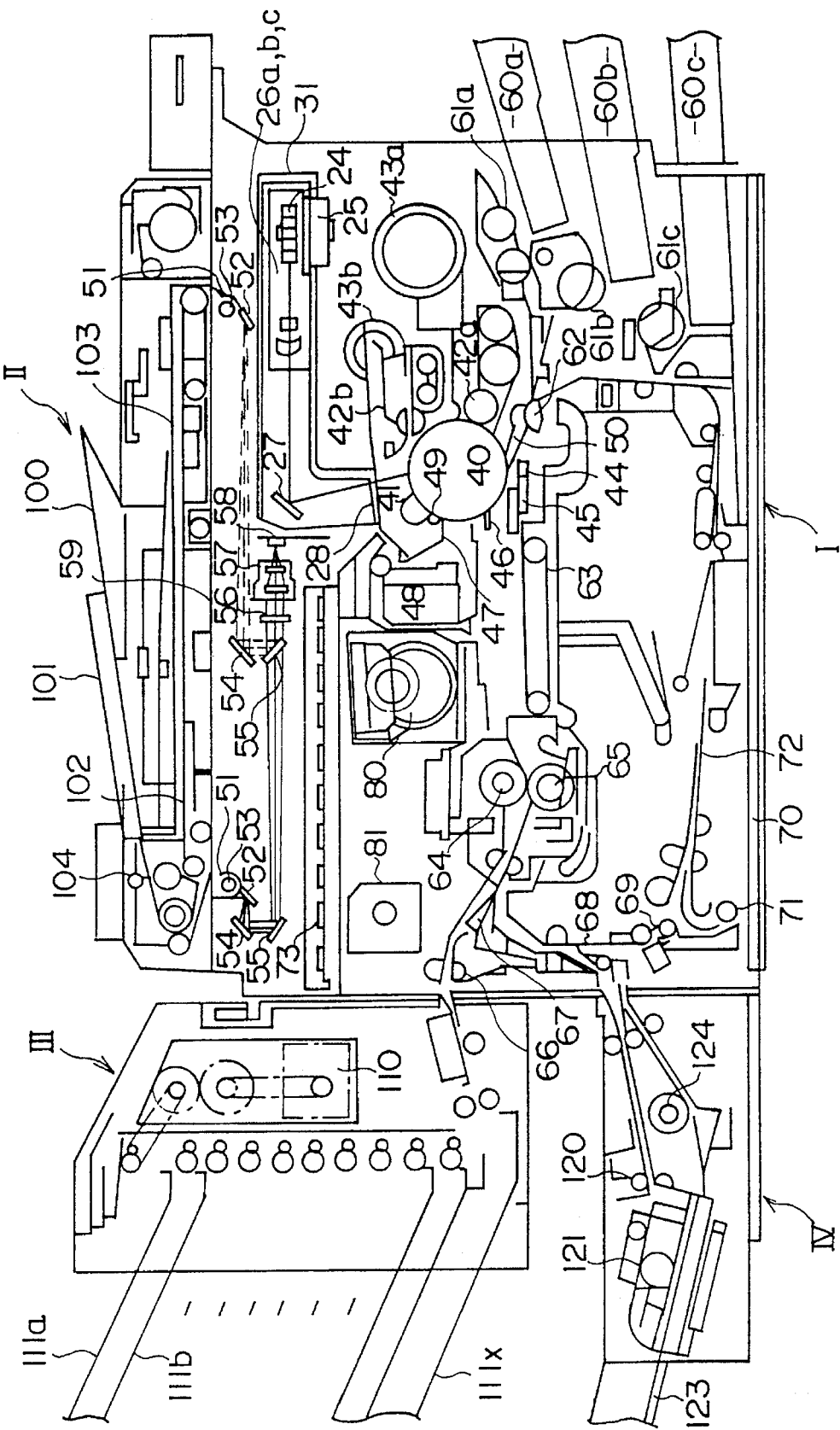
FIG. 6 is a sectional view showing a digital copying machine to which the present invention is applied.

A description will be given, with reference to FIGS. 6 through 8, of a digital copying machine to which the present invention is applied. FIG. 6 shows the construction of the digital copying machine. The digital copying machine comprises a main part I, an automatic document feeder (ADF) unit II, a sorter unit III, and a duplex unit IV. The main part I includes a scanner (SC) unit, a recording unit, an imaging unit, and a sheet feeding unit. A printer (PR) unit is made up of the recording unit and the imaging unit.

In the scanner unit of the main part I shown in FIG. 6, a first scanner having a reflector 51, a light source 53 and a first mirror 52 moves in a direction along the contact glass 59 at a constant rate to scan a document on the contact glass 59. A second scanner having a second mirror 54 and a third mirror 55 is rotated in the transverse direction of the contact glass 59 at a rate which is half the rate of the first scanner, following the movement of the first scanner. By means of the first and second scanners, the document on the contact glass 59 is optically read by the light from the light source 53. Light reflected from the document is led to a focusing lens 57 via a color filter 56, so that an image is formed on a set of charge coupled devices (CCDs) 58.

The light source 53 of the scanner unit uses a fluorescent lamp because it has a relatively long operative period. The light source 53 must be driven at an operating frequency higher than an operating frequency of the CCDs 58 because the CCDs 58 are driven by a given sampling clock. Analog signals indicating the image of the scanned document are output by the CCDs 58 and the analog signals are converted to digital signals by an analog-to-digital (A/D) converter of an image processing unit 73. The digital signals are subjected to several image processing processes performed by the image processing unit 73, so that digital image signals indicating a set of pixel data are produced.

Figure 7:
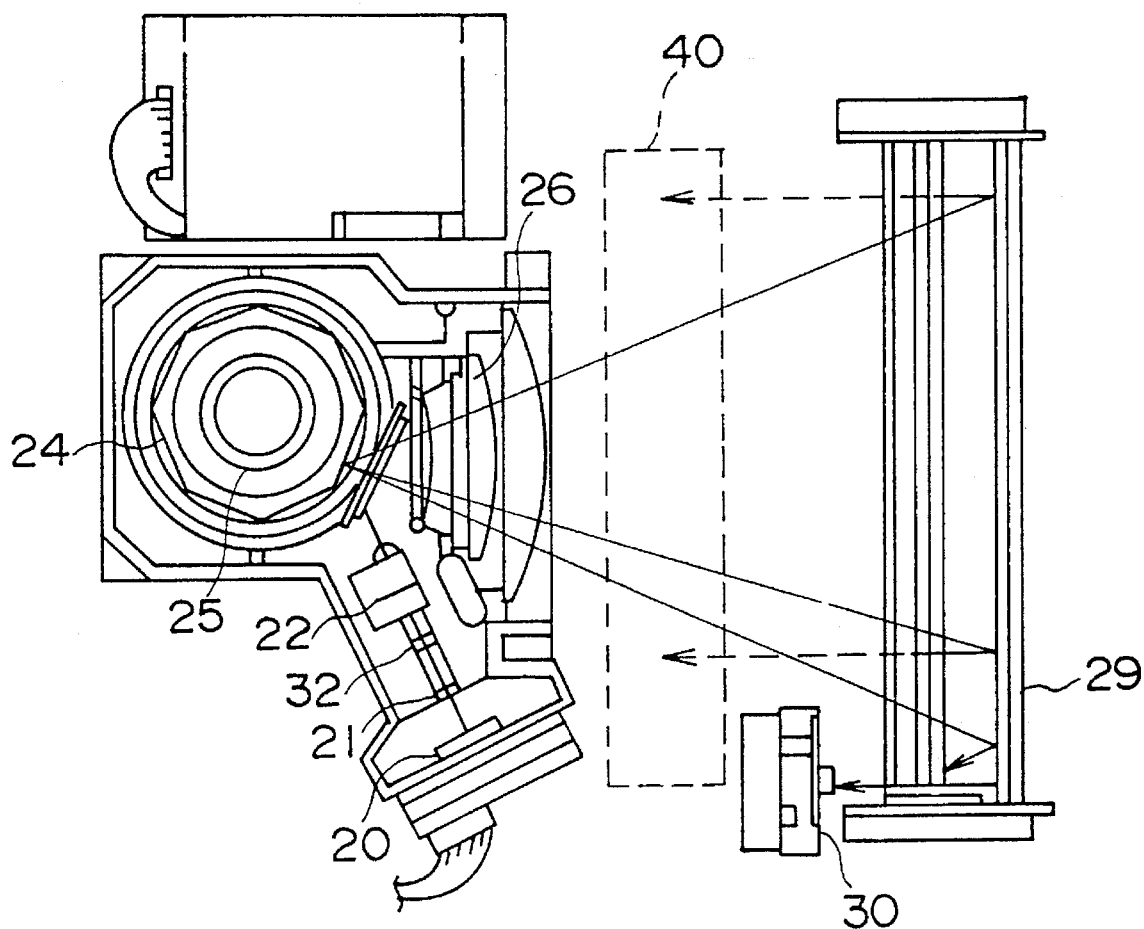
FIG. 7 is a plan view showing a recording unit of the digital copying machine shown in FIG. 6.

FIGS. 7, 8A and 8B show the recording unit of the main unit I shown in FIG.6. In the recording unit, laser light is led to a photosensitive drum 40 in accordance with the digital image signals from the scanner unit after the image processing performed so that a latent image is formed on the photosensitive drum 40.

In the recording unit shown in FIGS. 7, 8A and 8B, laser light is emitted from a semiconductor laser 20 is converted to a collimated light by a collimate lens 21. This collimated light is led to a cylindrical lens 22 via an aperture 32 so that the light shaped by the aperture 32 which light is compressed in the sub scanning direction is led to a polygonal mirror 24 through the cylindrical lines 22. The polygonal mirror 24 has an accurate polygonal shape, and is rotated by a motor 25 in a given direction at a given rotating speed. The rotating speed of the polygonal mirror 24 is determined in accordance with the rotating speed of the photosensitive drum 40, the recording density and the number of surfaces of the polygonal mirror 24.

The laser light from the light source 20 is deflected by the polygonal mirror 24, and the deflected light is led to a mirror 29 through an f0 lens 26. The polygonal mirror 24 is rotated at the given rate as described above, and the photosensitive drum 40 is scanned by the light reflected from the mirror 29 at a constant rate in a direction of the longitudinal axis of the photosensitive drum 40 by means of the f0 lens 26. The laser light reflected by the mirror 29 when it is directed to a position located out of the scanning range is led to a photodetector 30 for each scanning line. Each time the laser light is received, the photodetector 30 sends a signal to a light sensing part (not shown) and the light sensing part outputs a sync signal PMSYNC. This sync signal is used as the reference signal indicating the start timing of each main scanning by the laser light. When a given time period has elapsed since the sync signal PMSYNC is output, the photosensitive drum 40 is scanned by the laser light for outputting the image data corresponding to one scanning line. By repeating the above described procedure, a latent image corresponding to one page is formed on the photosensitive drum 40.

The digital copying machine shown in FIG. 6 uses a known negative/positive (N/P) process for forming an image on the photosensitive drum 40. A photosensitive layer of the photosensitive drum 40 is charged to an initial negative potential by a charger 41. An area of the photosensitive drum 40 to which the laser light is applied is subjected to a different potential, and the other areas of the photosensitive drum 40 remain at the initial negative potential. A latent image is thus formed on the photosensitive drum 40 due to the applied laser light.

In the digital copying machine shown in FIG. 6, a mirror 27, a dustproof glass 28, a lens holding unit 31, a separating pawl 46, a main motor 80, and a fan motor 81 are provided. A prescribed bias voltage is applied to a first developing part 42a and a second developing part 42b in the digital copying machine, and a first toner supply part 43a containing black toner and a second toner supply part 43b containing color toner are provided. The toner is attached to the latent image on the photosensitive drum 40 at each of the first and second developing parts 42a and 42b. A copy sheet is transported in synchronism with the rotation of the photosensitive drum 40, and the toner image on the photosensitive drum 40 is transferred to the copy sheet by a transfer charger 44. A separating charger 45 is integrally formed with the transfer charger 44, and the copy sheet with the image is separated from the photosensitive drum 40 by the separating charger 44.

The residual toner on the photosensitive drum 40 is removed by a cleaning blade 47, and such toner is collected to a toner tank 48. The pattern of the remaining potential of the photosensitive drum 40 is eliminated by irradiating light from a lamp 49 thereto.

In the paper feeding part of the digital copying machine shown in FIG. 6, one of a plurality of paper cassettes 60a, 60b, 60c is selected to feed a copy sheet from the selected cassette. After a start button of the digital copying machine is depressed, one copy sheet is sent to a registration roller 62 by the rotation of one of a plurality of feeding rollers 61a, 61b, 61c located at the selected cassette. The registration roller 62 is rotated in accordance with the position of the latent image formed on the rotating photosensitive drum 40, such that the copy sheet is fed to a prescribed position of the photosensitive drum 40. After the toner image of the photosensitive drum 40 is transferred to the copy sheet, the copy sheet is sent to a fixing part by a transport roller 63. The fixing part has a heating roller 64 and a pressure roller 65, and the toner image is fixed to the copy sheet by the fixing part.

When the normal copying as mentioned above is completed, the copy sheet is fed by a selector 67 to an ejection outlet leading to the sorter unit III. When a multiple copying process is performed, the copy sheet is fed by selectors 68 and 69 to a re-feeding loop 72. The copy sheet from the re-feeding loop 72 is again sent to the registration roller 62. When a two-sided copying is performed, the copy sheet in the re-feeding loop 72 is fed to a tray 70 by a selector 69. The copy sheet on the tray 70 is sent back to the re-feeding loop 72 by the reverse rotation of a roller 72. And, the copy sheet from the re-feeding loop 72 is again sent to the registration roller 62.

Figure 1:
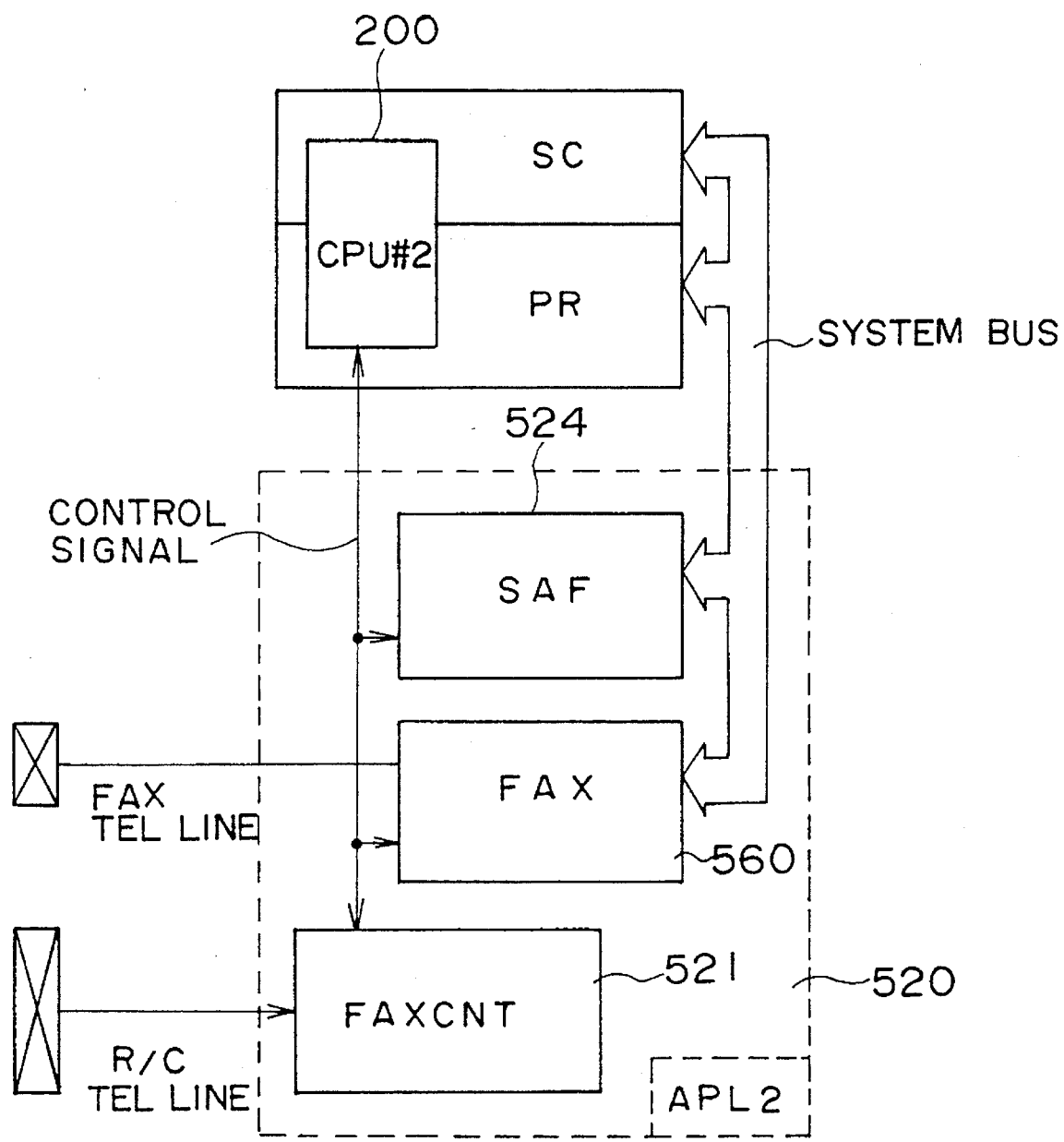
FIG. 1 is a block diagram showing a first embodiment of a facsimile unit connected to a remote-controlled copying apparatus according to the present invention.

The ADF unit II shown in FIG.1 is an automatic unit attached to the main part I, which feeds a document to a contact glass 59 one by one, and ejects the document after a copying is completed. Sheets of paper (the document) placed on a document plate 100 are sent in support of a side guide 101 to a pair of rollers 104, and each sheet of the document is separately fed by rotation of a transport belt 102 to a prescribed reading position of the contact glass 59. After a copying is finished, the document is fed by rotation of the transport belt 102 to an ejection tray 103.

The sorter unit III is an automatic unit for selectively feeding copy sheets into a plurality of ejection trays 111a, 111b, . . . , 111x in accordance with the page of the original document. The copy sheets fed from the main part I are selectively sent to the ejection trays by rotation of a plurality of rollers rotated by a motor 110, and they are sorted by a selector at the inlet of the trays.

The duplex unit IV shown in FIG. 1 is used to automatically produce two-sided copy sheets. After the front-side copying is completed, the copy sheet is fed downward by rotation of the roller 66, and sent by the selector 67 from the main part I into the duplex unit IV. The copy sheet is further fed to a tray 123 of the duplex unit IV by an ejection roller 120. The same procedure is repeated, and a number of copy sheets are stored on the tray 123. Each of these copy sheets is fed from the tray 123 to the main part I by a re-feeding roller 124. In the main part I, the copy sheet is sent to the re-feeding loop 72 by the selector 69 so that the reverse-side copying is performed.

Figure 9:
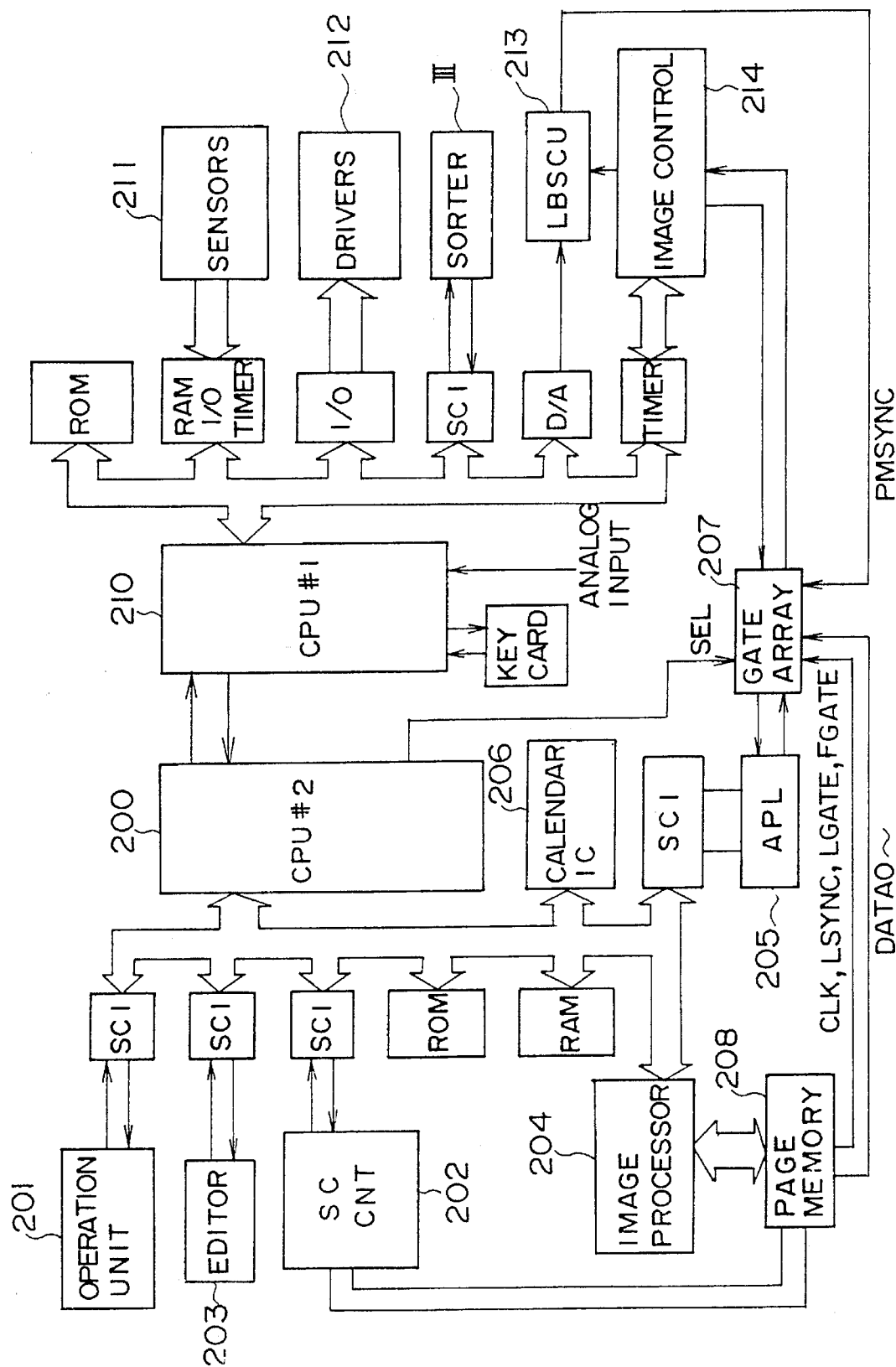
FIG. 9 is a block diagram showing a control unit of the digital copying machine shown in FIG. 6.

Next, a control unit of the digital copying machine will be described. FIG. 9 shows a control unit for controlling operations of the digital copying machine shown in FIG. 6. This control unit includes two central processing units (CPUs): a first CPU 210 as a sequence controller of the digital copying machine, and a second CPU 200 as an operation controller thereof. The two CPUs are connected to each other through a serial interface.

The first CPU 210 carries out a paper transport timing control, an imaging condition setting, and an imaging control. Signals from several paper transport related sensors 211 are input to the first CPU 210. Several drivers 212 used for driving motors, relays, solenoids, etc. are connected to the first CPU 210 via an input-output interface. The sorter unit III is connected to the first CPU 210 via a serial interface, and sheets of paper are sorted at prescribed timings in accordance with signals output from the first CPU 210. Analog signals indicating a fixing temperature, a photosensor input, a laser diode monitor input, a laser diode reference voltage, and a feedback value of a power supply output are input to the first CPU 210. A laser beam scanner unit (LBSCU) 213 is connected to the first CPU 210 via a digital-to-analog (D/A) converter. An analog input signal of the first CPU 210 and the D/A converter are used to output a control signal for maintaining the power of the laser diode at a prescribed level.

The second CPU 200 controls a plurality of serial ports. The first CPU 210, an operation unit 201, a scanner controller (SCCNT) 202, an editor 203, and an application (APL) unit 205 are connected to the serial ports of the second CPU 200.

The operation unit 201 is provided with operator's input keys and a display for indicating operating conditions of the digital copying machine. An instruction input by an operator from the input keys of the operation unit 201 is transmitted to the second CPU 200 through a serial interface. In accordance with the input instruction, the second CPU 200 transmits a signal to the operation unit 201 through the serial interface so that the display indicates the operating conditions of the digital copying machine. The second CPU 200 detects the setting details of the main part I and transmits a signal to the first CPU 210 through the serial interface so that the main part I performs a copying operation in accordance with the setting details.

In the scanner controller 202, a scanner servo motor drive control, an image processor control, a read data serial transmitting control, and an ADF and second CPU interface control are carried out. The application (APL) unit 205 is an interface unit between the second CPU 200 and an external unit. The external unit is, for example, an external facsimile unit or a data file storage. A predetermined control data is received from the external unit via this interface unit, and it is transmitted to the second CPU 200. In a calendar IC (integrated circuit) 206 connected to the second CPU 200, date and time data is stored. In accordance with the date and time data from the calendar IC 206, the second CPU 200 carries out a current date/time indication of the display of the operation unit 201 and an on/off timer control of the power supply. The second CPU 200 carries out an on/off timing control of the units of the digital copying machine.

The gate array 207 receives a select signal (SEL) from the second CPU 200, and outputs image data signals and sync signals in accordance with the select signal (SEL) of the second CPU 200. More specifically, the output signals of the gate array 207 are as follows.

(1) The gate array 207 outputs the 8-bit image data signals (DATA0-DATA7) (which are serially transmitted from the scanner controller 202) to the image control unit 214 in synchronism with the sync signal PMSYNC from the LBSCU 213.

(2) The gate array 207 outputs the 8-bit image data signals (DATA0-DATA7) of the scanner controller 202 to the APL unit 205 by parallel transmission. The APL unit 205 outputs the input image data to an external facsimile unit or a data file storage via a telephone line.

(3) The gate array 207 outputs the image data signals received at the APL 205 (which are 8-bit, 4-bit, or 1-bit image data signals serially transmitted from an external facsimile unit) to the image control 214 in synchronism with the sync signal PMSYNC from the LBSCU 213. When 4-bit or 1-bit image data signals are received from the external facsimile unit, the input signals are converted into 8-bit data signals by a converter (not shown).

Figure 11:
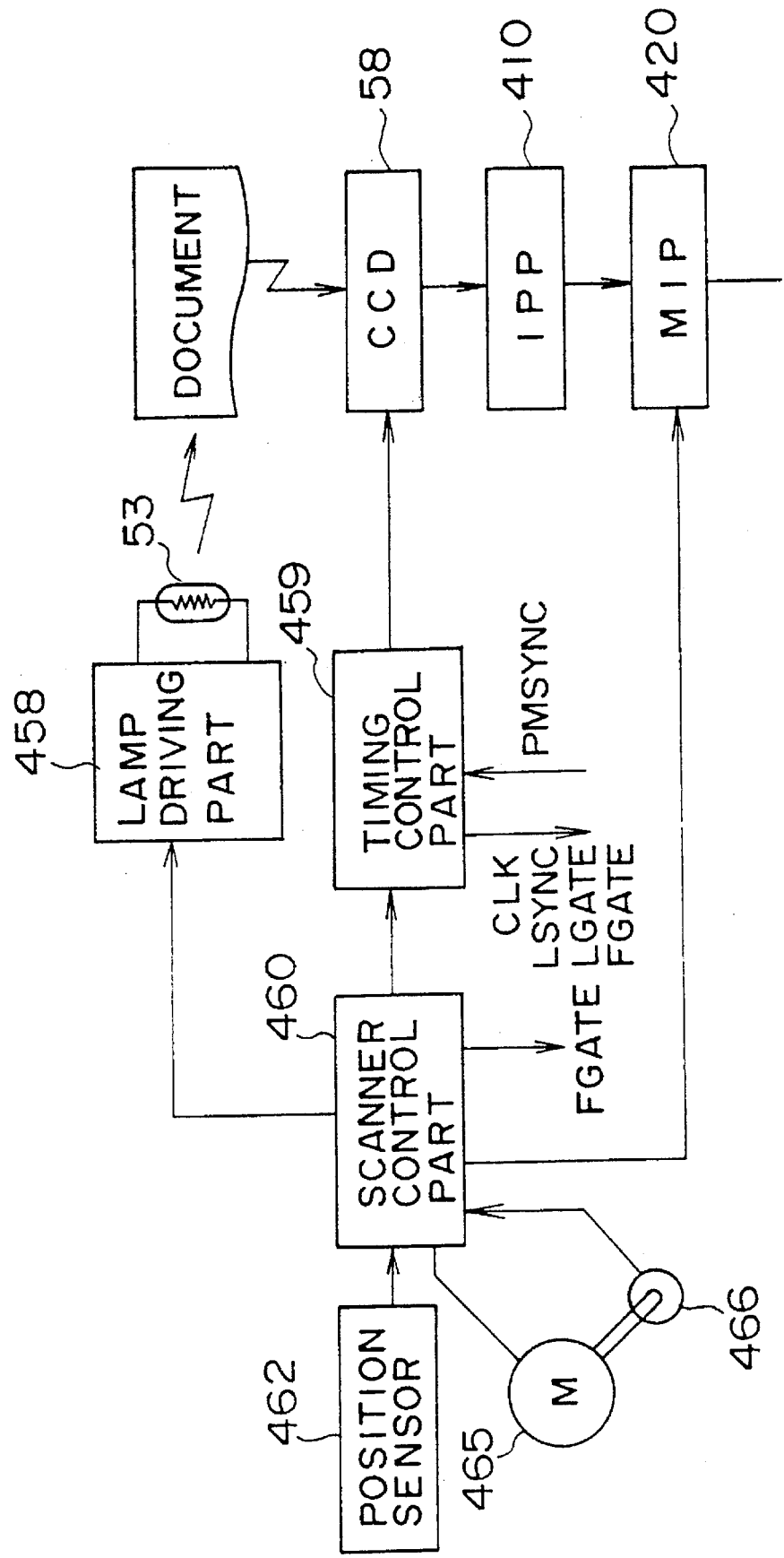
FIG. 11 is a block diagram showing a scanner control unit and an image processor of the apparatus of the present invention.

FIG. 11 shows the image processor 204 and the scanner controller 202 in the control unit shown in FIG. 9. In FIG. 11, analog signals, output from the CCDs 58 of the scanner unit, are sent to an image preprocessor (IPP) 410 so that a preliminary image processing of the analog signals is performed. The signals from the IPP 410 are sent to a main image processor (MIP) 420 so that a main image processing of the signals from IPP 410 is performed.

In accordance with instructions from the second CPU 200, a scanner control part 460 outputs control signals to a lamp driving part 458, a timing control part 459, a scanner driving motor 465 and an enlarging/reducing unit of the MIP 420, so that the operations of these parts are controlled. A rotary encoder 466 is connected to a driving axis of the scanner driving part 458. A position sensor 462 is provided to sense a position of the scanner unit relative to the scanned document in a sub scanning direction, and outputs a signal indicating the sensed position to the scanner control part 460. The lamp driving part 458 performs the on/off control of the light source 53 and the light quantity control thereof, in accordance with the control signals from the scanner control part 460.

The timing control part 459 outputs several timing signals in accordance with the control signals of the scanner control part 460. When the scanning of the document starts, the timing control part 459 outputs a transfer signal and a shift clock signal to the CCDs 58. Image signals from the scanned document corresponding to one scanning line are transferred from the CCDs 58 to shift registers in response to the shift signal from the timing control part 459. One pixel data (1-bit) is output from the shift registers each time the shift clock signal is received from the timing control part 459.

The timing control part 458 outputs a pixel sync clock signal (CLK), a line sync signal (LSYNC), and a main scanning effective-period sync signal (LGATE) to the recording unit. The CCDs 58 of this embodiment outputs effective image data of 4800 bits per scanning line to the IPP 410.

When an instruction to start the scanning of the document is received from the second CPU 200, the scanner control part 460 turns ON the light source 53 and starts driving the scanner driving motor 465. The timing control part 459 is controlled so that the scanning of the document by means of the CCDs 58 is started. When the scanning of the document is started, a sub scanning effective-period sync signal (FGATE) is set to the high level.

Figure 12:
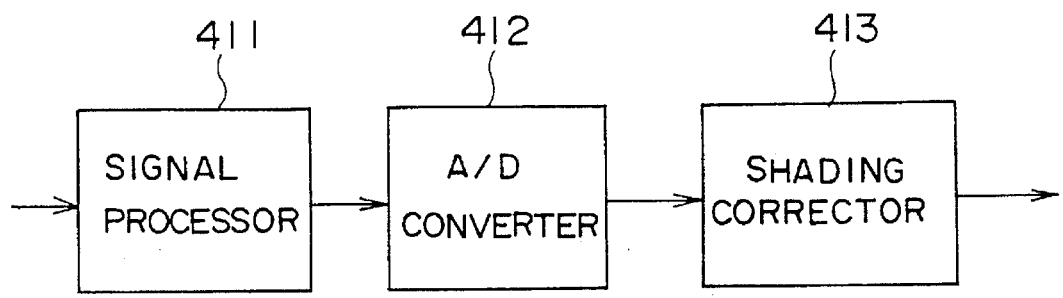
FIG. 12 is a block diagram showing an image preprocessor of the apparatus of the present invention.

FIG. 12 shows the construction of the image preprocessor (IPP) 410. The IPP 410, as shown in FIG. 12, includes a signal processor 411, an analog-to-digital (A/D) converter 412, and a shading corrector 413. In the signal processor 411, an amplification of image signals and a light quantity correction thereof are performed. Analog signals from the signal processor 411 are converted to digital multi-level signals by the A/D converter 412. In the shading corrector 413, a shading correction process for the digital signals of the A/D converter 412 is performed. The shading-corrected digital signals from the shading corrector 413 are output to the MIP 420.

Figure 13:
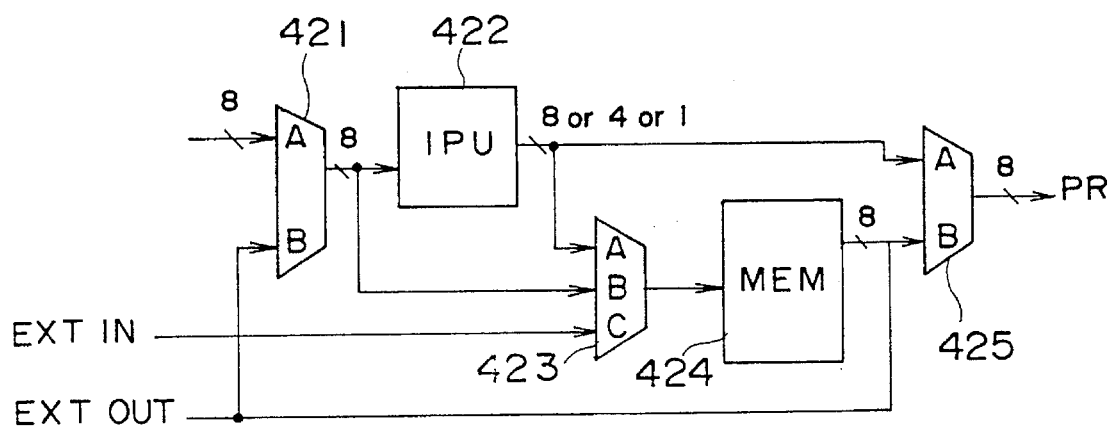
FIG. 13 is a block diagram showing a main image processor of the apparatus of the present invention.

FIG. 13 shows the construction of the main image processor (MIP) 420. The MIP 420, as shown in FIG. 13, includes a multiplexer 421, an image processing unit (IPU) 422, a multiplexer 423, a frame memory (MEM) 424, and a multiplexer 425. The image signals from the IPP 410 are processed by the MIP 420 and the processed image signals are stored therein when necessary. In the MIP 420 shown in FIG. 13, an EXT IN terminal from which image signals of an external unit are input, and an EXT OUT terminal to which image signals of the MIP 420 are output. The image signals (8 bit data) from the IPP 410 are selected at the multiplexer 421, and the image signals are input to the IPU 422. In the IPU 422, an MTF (modulation transfer function) correcting process, an enlarging/reducing process, a gamma transforming process, and a multi-level image data process for quantization into 8-bit, 4-bit or 1-bit image data) are performed for the input image signals. The image signals from the IPU 422 are selected at the multiplexer 423, so that the image signals (8 bits) are output to the printer (PR) unit.

Figure 10:
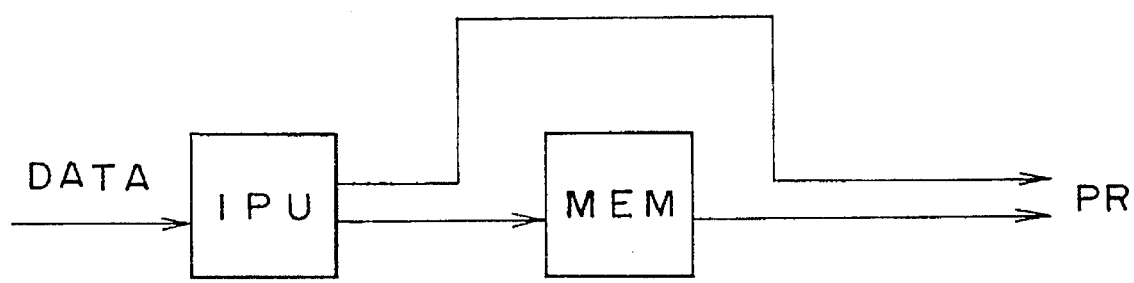
FIG. 10 is a diagram showing a flow of data in an image processing performed by a main image processor of the apparatus according to the present invention.

In the main image processor (MIP) shown in FIG. 13, a frame memory (MEM) 424 is provided for storing the image signals output by the IPU 422. FIG. 10 shows a data flow of the image processing performed by the main image processor (MIP) of the digital copying machine. In the main image processor shown in FIG. 10, the image signals from the IPU are stored in the frame memory (MEM), and the stored image signals in the frame memory are output to the printer (PR) unit when necessary. Or, in the main image processor shown in FIG. 10, the image signals from the IPU are output to the printer (PR) unit and stored in the frame memory (MEM). A subsequent image forming process is performed with the image signals read from the frame memory (MEM).

FIG. 14 shows a data flow of an image processing performed by the main image processor (MIP) 420. In the MIP 420 of this embodiment, as shown in FIG. 14, either the image signals processed by the IPU 422 or the nonprocessed image signals is stored in the frame memory (MEM) 424. The flow of the image signals in the MIP 420 can be changed by selection of the multiplexers 421, 423 and 425. Thus, it is possible for the digital copying machine to produce a plurality of copy sheets in which images are modified by using the same image signals read from a scanned document.

FIG. 15 shows the construction of the image processing unit (IPU) 422 shown in FIG. 13. As shown in FIG. 15, the IPU 422 includes an MTF (modulation transfer function) corrector 426, an enlarging/reducing part 427, a gamma transformer 428, and a quantizer 429. The MTF corrector 426 performs an MTF correcting process for the 8-bit digital image signals input to the IPU 422. The enlarging/reducing part 427 performs an enlarging/reducing process for the image signals from the MTF corrector 426 in accordance with the enlarging/reducing ratio set by the scanner controller 460. The gamma transformer 428 performs a gamma transforming process for the image signals from the enlarging/reducing part 427 such that the output image signals are corrected to be suitable for the output unit. The quantizer 429 quantizes the image signals from the gamma transformer 428 so that multi-level image data is generated by the quantization.

Figure 16:
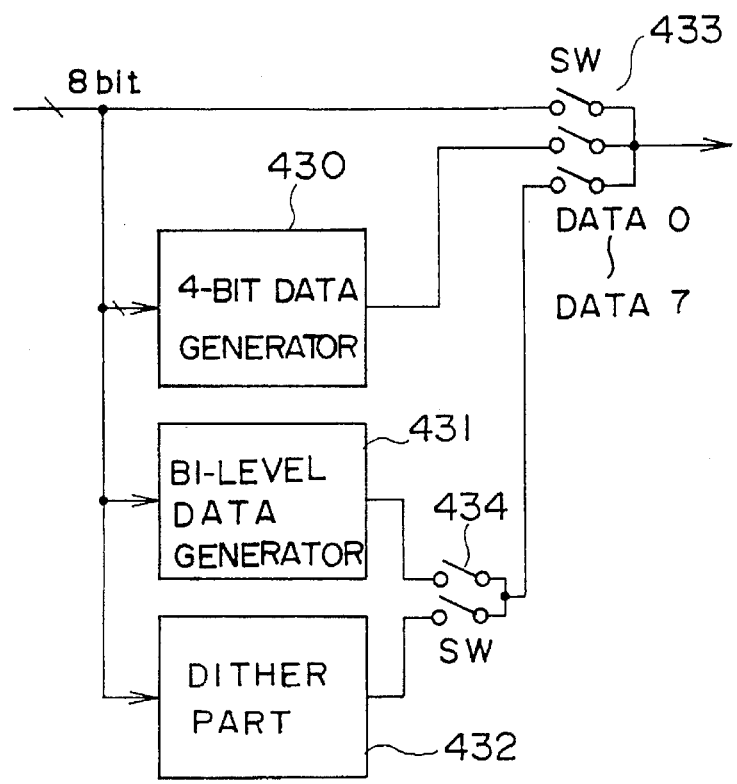
FIG. 16 is a block diagram showing a quantizer of the image processing unit shown in FIG. 15.
Figure 17:
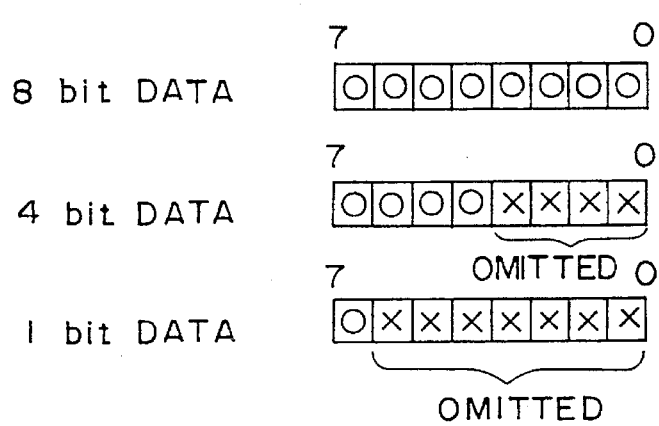
FIG. 17 is a diagram showing three types of multi-level image data signals generated by the quantizer shown in FIG. 16.

FIG. 16 shows the construction of the quantizer 429. FIG. 17 shows three types of multi-level image data signals generated by the selected quantization process. In the quantizer 429 shown in FIG. 16, a 4-bit data generator 430 generates 4-bit image data signals from the 8-bit image signals of the gamma transformer 428. A bi-level data generator 431 generates 2-bit image data signals by comparing the 8-bit image signals with a prescribed threshold value, so that 1-bit image data signals are output. A dither part 432 generates 1-bit image data signals from the 8-bit image signals of the gamma transformer 428, so that an area-gradation image is produced by the 1-bit image data. A switch 433 is used to select one of three types of multi-level image data: 8-bit image data, 4-bit image data, and 1-bit image data. A switch 434 is used to select either the image data signals of the bi-level data generator 431 or the image data signals of the dither part 432. As shown in FIG. 17, the 8-bit image data signals, output by the quantizer 429, is indicated by the 8-bit image signals of the gamma transformer 428. In the 4-bit image data signals output by the quantizer 429, the four least significant bits (LSB) of the 8-bit image signals of the gamma transformer 428 are omitted. In the 1-bit image data signals output by the quantizer 429, the seven LSBs of the 8-bit image signals of the gamma transformer 428 are omitted.

Figure 18:
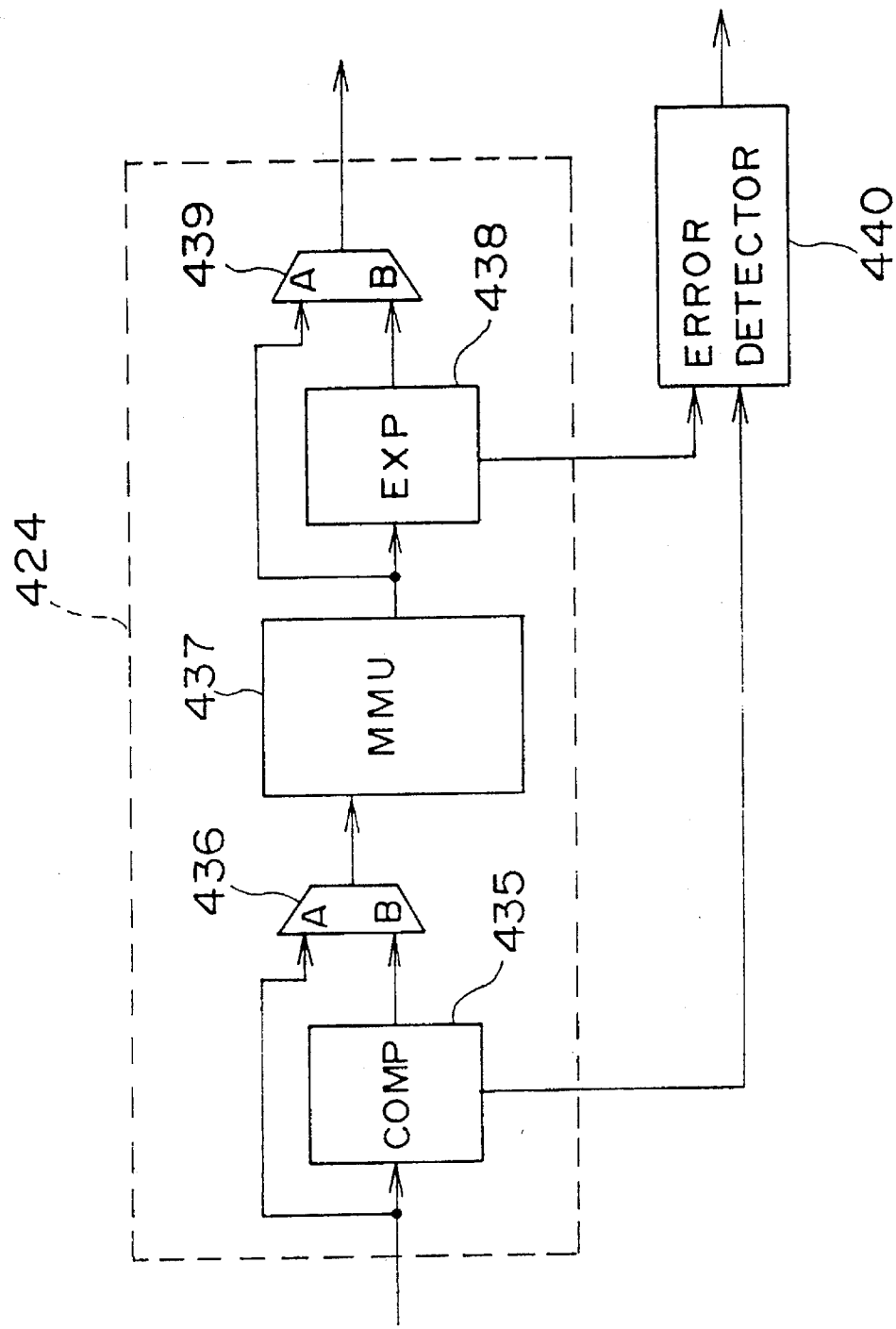
FIG. 18 is a block diagram showing a frame memory of the main image processor shown in FIG. 13.

FIG. 18 shows the construction of the frame memory (MEM) 424. In the frame memory (MEM) 424 shown in FIG. 18, a memory unit (MMU) 437, a compression (COMP) part 435 input to the MMU 437, and an expansion (EXP) part 438 output to the MMU 437 are provided. The compression part 435 compresses the image signals from the IPU 422, and is provided with a multiplexer 436 for selecting either the image signals from the IPU 422 or the compressed image signals from the compression part 435. The image signals selected by the multiplexer 436 are stored in the MMU 437. The expansion part 438 decompresses the compressed image signals from the MMU 437, and is provided with a multiplexer 439 for selecting either the non-compressed image signals from the MMU 437 or the reconstructed image signals from the expansion part 438. The image signals selected by the multiplexer 439 are output from the frame memory 424 to the printer (PR) unit. When the compressed image signals are stored in the MMU 437, both the multiplexers 436 and 439 are switched to the terminal "B". When the original, non-compressed image signals are stored in the MMU 437, both the multiplexers 436 and 439 are switched to the terminal "A".

Figure 19:
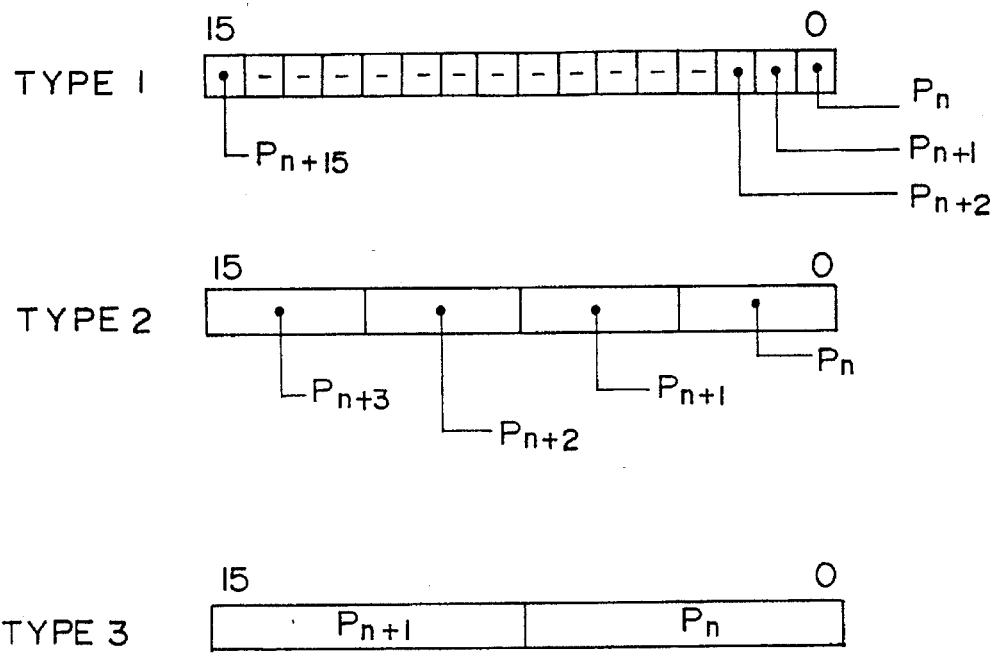
FIG. 19 is a diagram showing three types of image data signals used in the main image processor of the present invention.

FIG. 19 shows three types of image data signals used in the main image processor according to the present invention. In the digital copying apparatus of the present invention, the speed of inputting image signals from the scanner (SC) unit and the speed of outputting image signals from the printer (PR) unit are set to a fixed level, regardless of which type of image signals is used among the three types of image signals: 8-bit image data, 4-bit image data and 1-bit image data. In other words, a fixed time period of one pixel is used in the data flow of the digital copying apparatus of the present invention. In each of the 8-bit image data signals, a number of the least significant bits are omitted and the remaining bits are used in the data flow.

Figure 20:
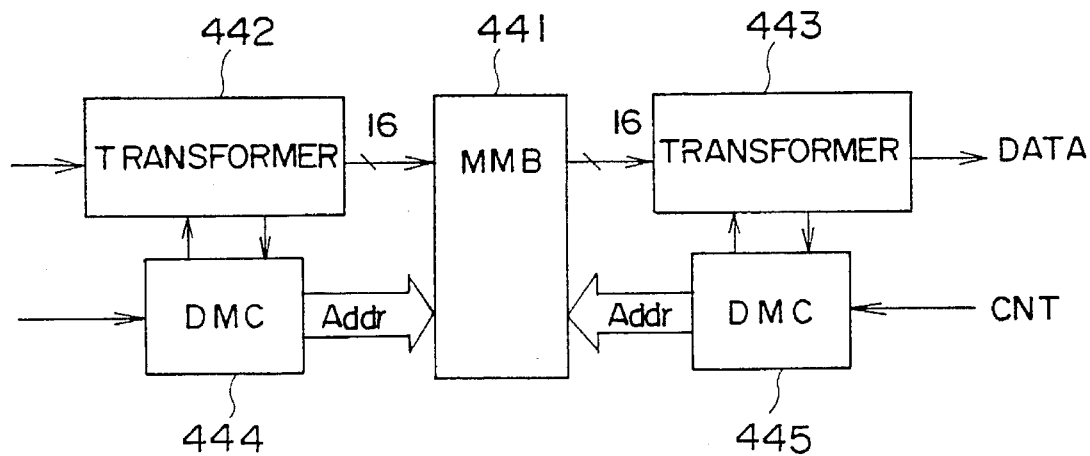
FIG. 20 is a block diagram showing a memory unit of the frame memory shown in FIG. 18.

FIG. 20 shows the construction of the memory unit (MMU) 437 of the frame memory shown in FIG. 18. In the MMU 437 shown in FIG. 19, a memory block (MMB) 441, a data transformer 442 input to the MMB 441, and a data transformer 443 output to the MMB 441 are provided in order to store either the image data signals of the three types shown in FIG. 19 or the compressed image signals. The input data transformer 442 is coupled to a direct memory controller (DMC) 444, and the output data transformer 443 is coupled to a direct memory controller (DMC) 445.

The writing of image data signals to the MMB 441 at controlled memory addresses and the reading of the image data signals from the MMB 441 at the memory addresses are carried out by means of the DMCs 444 and 445, in accordance with the contents of the image data signals. The data transformers 442 and 443 are used to transform the image data signals from the IPU 422 into 16-bit data signals and vice versa, allowing the 16-bit data signals to be stored in the MMB 441 and allowing the original image data signals to be output from the MMU 437.

Figure 21:
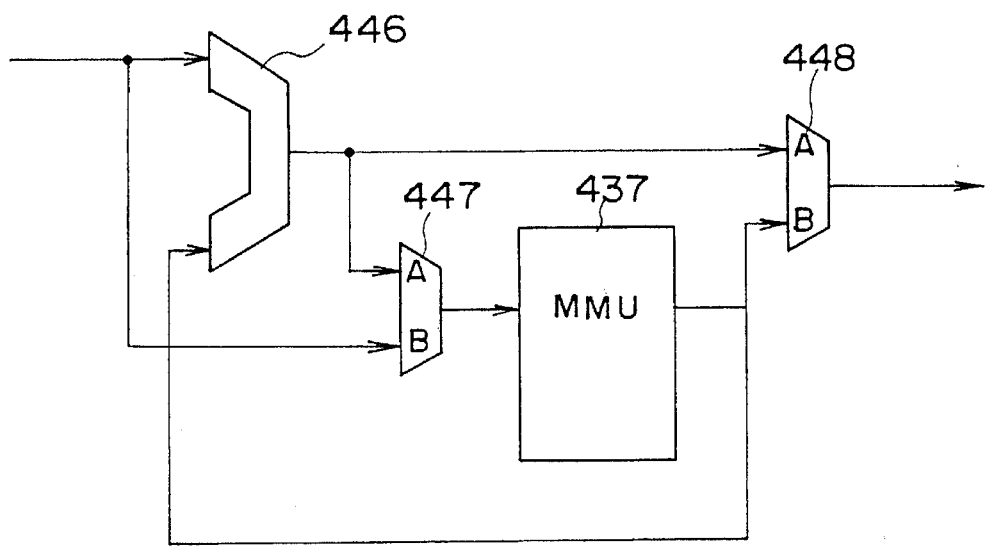
FIG. 21 is a block diagram showing a modified frame memory of the main image processor shown in FIG. 13.

FIG. 21 shows a modified frame memory of the main image processor shown in FIG. 13. In the modified frame memory shown in FIG. 21, the memory unit (MMU) 437, a multiplexer 447, a multiplexer 448, and a pixel process unit (PPU) 446 are provided. The compression part 435 and the expansion part 438 in the frame memory shown in FIG. 18 are not included in the frame memory shown in FIG. 21. The PPU 446 carries out arithmetic operations (for example, AND, OR, EXOR and NOT) between the image data signals so that the results of the operations are output to the printer (PR) unit. The PPU 446 carries out arithmetic operations between the image data signals input to the frame memory and the image data signals output from the frame memory, so that the results of the operations are stored in the memory unit (MMU) 37. The output of the image data to the printer (PR) unit and the input-output switching of the MMU 37 are performed by means of the multiplexers 447 and 448. Generally, the latter function of the PPU 446 mentioned above is used for an image synthesization by which a composite image is produced.

Figure 23:
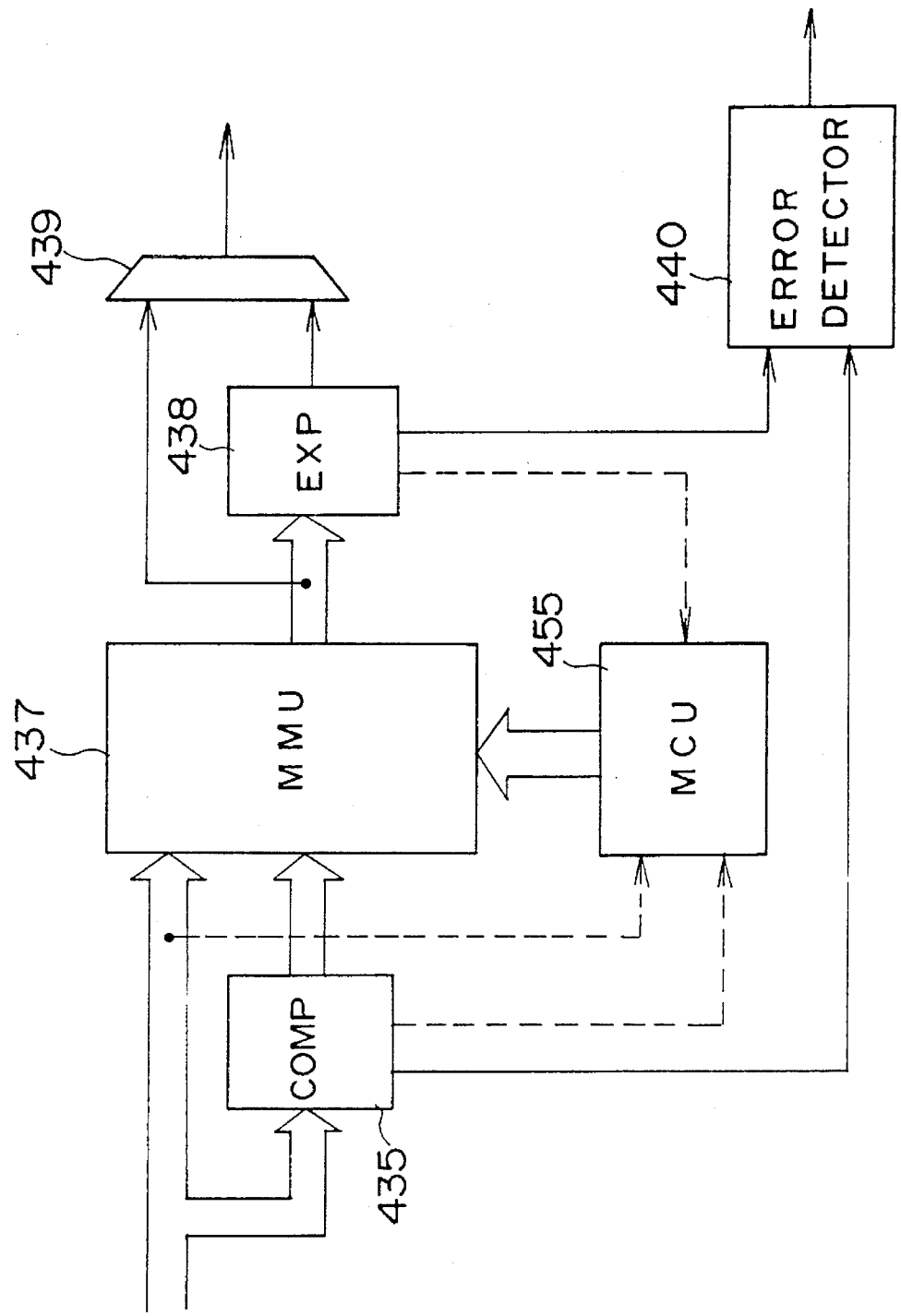
FIG. 23 is a block diagram showing a modified frame memory of the main image processor shown in FIG. 13.

FIG. 23 shows a modified frame memory of the main image processor shown in FIG. 13. This frame memory is designed to compensate for the image data signals stored in the memory unit (MMU) 437 when the compression and decompression of the image data signals are slow and not in accordance with the data flow. In the frame memory shown in FIG. 23, the memory unit (MMU) 437, the compression (COMP) part 435 input to the MMU 437, the expansion (EXP) part 438 output from the MMU 437, a memory control unit (MCU) 455, the multiplexer 439, and an error detector 440 are provided.

The non-compressed image signals from the scanner (SC) unit and the compressed image signals from the compression part 435 are input to the MMU 437. In different areas of the MMU 437, these image signals are stored. The compressed image signals are output from the MMU 437 to the expansion part 438 so that the reconstructed image signals are output. When the compression by the compression part 435 and the decompression by the expansion part 438 are normally completed until the storing of one-page image signals in the MMU 437 is completed, only the compressed image signals in the MMU 437 are retained and the non-compressed image signals in the MMU 437 are deleted. When an error signal from the compression part or the expansion part is detected by the error detector 440, the compressed image signals stored in the MMU 437 are deleted and the non-compressed image signals in the MMU 437 are retained. The MCU 455 is a control unit for allowing the two types of the image signals to be input to the MMU 437 and for allowing the one type of the image signals to be output from the MMU 437. The frame memory shown in FIG. 23 is useful in a case in which a page of image data retrieved from a plurality of pages of image data stored in the MMU is output to the printer (PR) unit.

Figure 22:
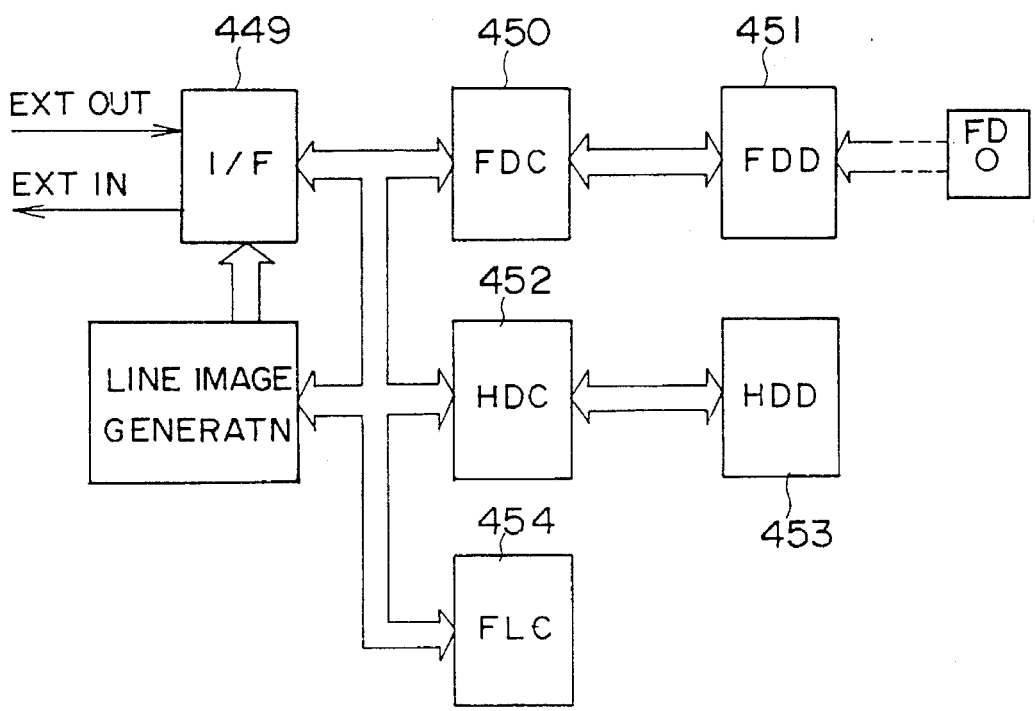
FIG. 22 is a block diagram showing an external storage device for storing image data signals.

FIG. 22 shows an external storage device used in the digital copying apparatus according to the present invention. When image data is stored in a floppy disk (FD), the image data signals from the EXT OUT Of the MIP 420 shown in FIG. 13 are output to a floppy disk controller (FDC) 450 via an interface (I/F) 449. The operations of the FDC 450 are controlled by a file controller (FLC) 454 so that the image data signals are stored in the floppy disk in a floppy disk drive (FDD) 451. In the external storage device shown in FIG. 22, the operations of a hard disk controller (HDC) 452 are controlled by the FLC 454 so that image data can be stored in a hard disk storage of a hard disk drive (HDD) 453 and the image data can be read from the HDD 453. The hard disk storage of the HDD 453 can be used as the storage device for storing frequently used image data.

Figure 24:
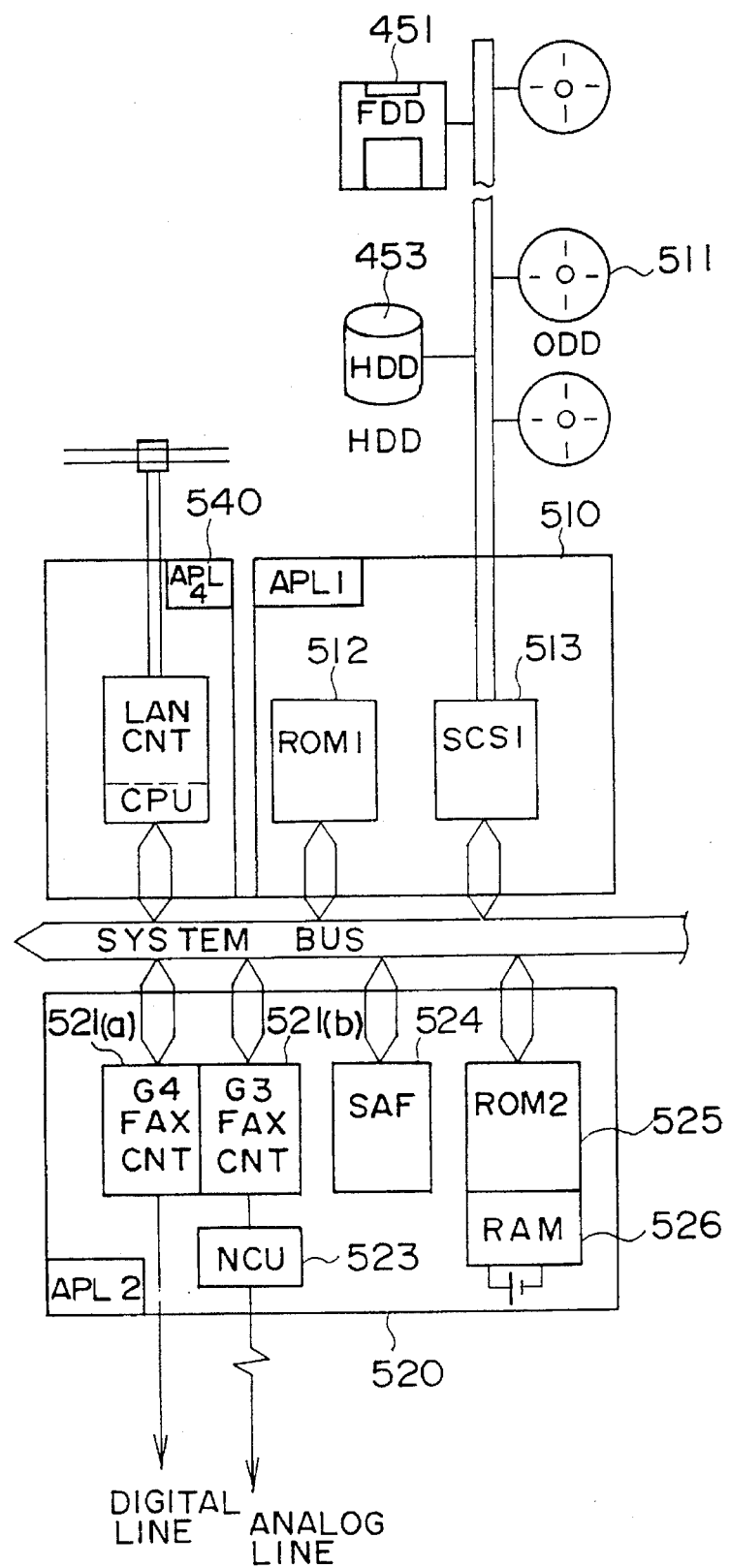
FIGS. 24 through 26 are block diagrams showing an application unit connected to the control unit of the copying apparatus according to the present invention.
Figure 25:
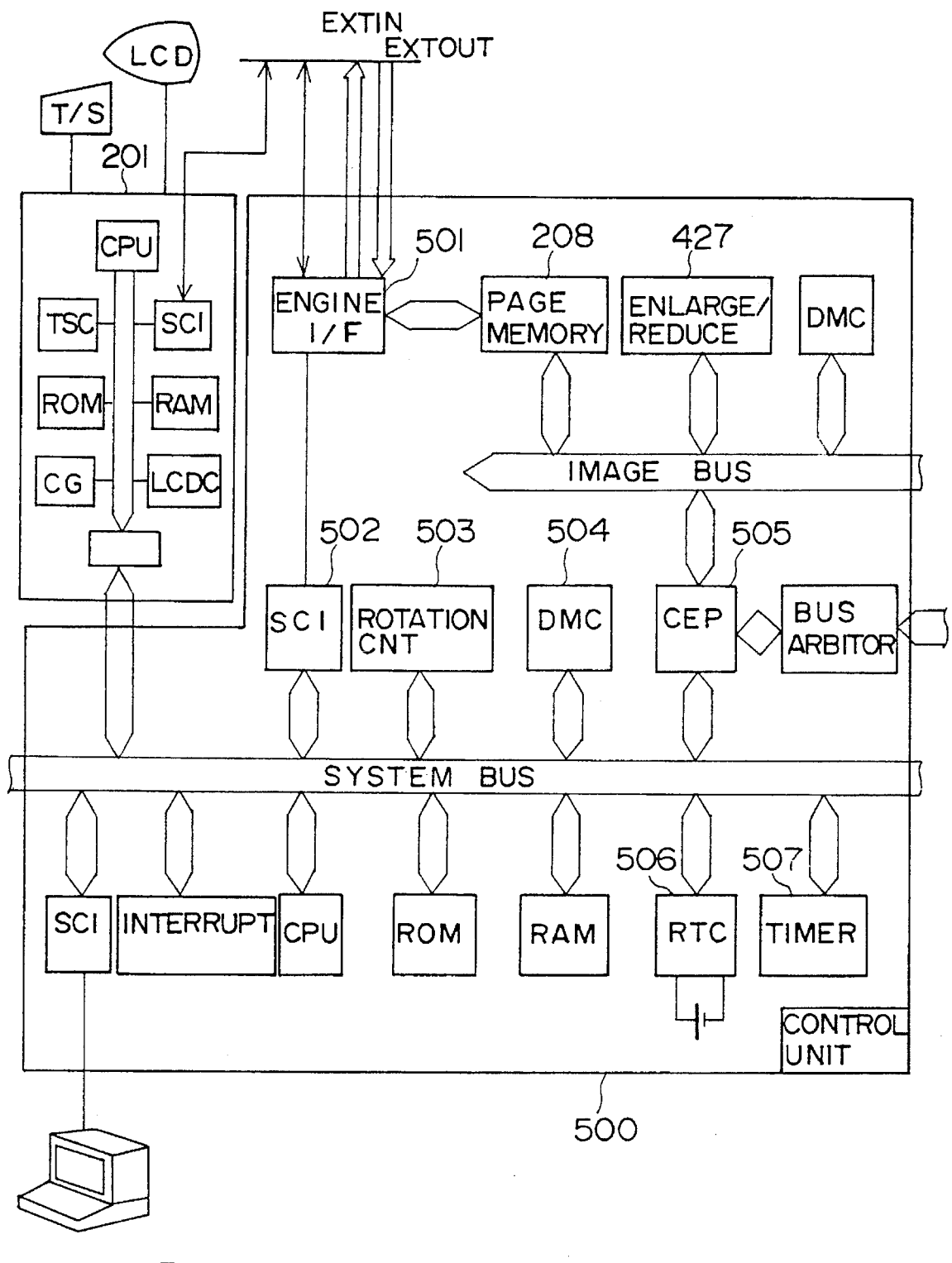
Figure 26:
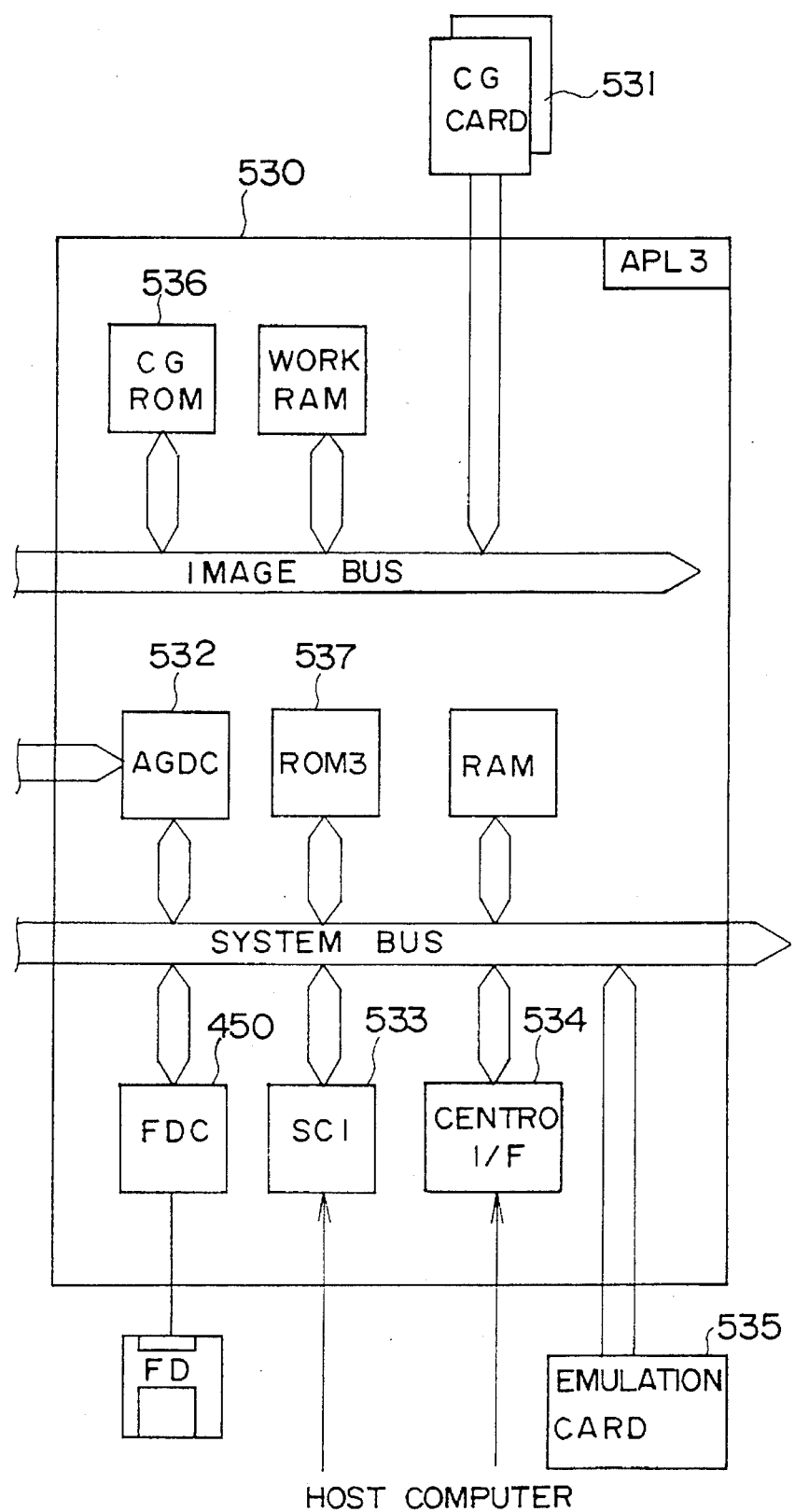

FIGS. 24 through 26 show the application units connected to the control unit of the digital copying apparatus according to the present invention. More specifically, FIG. 24 shows the construction of the application unit (APL), and FIG. 25 shows the construction of the control unit 500 and the operation part 201 in the digital copying apparatus according to the present invention. FIG. 26 shows the construction of an on-off printer unit (APL3) 530. In the APL shown in FIG. 24, a file unit (APL1) 510, a facsimile unit (APL2) 520, and an LAN unit (APL4) 540 are provided.

In the control unit 500 shown in FIG. 25, the serial data from the EXT OUT terminal is transformed by an engine interface 501 into parallel data. Parallel data in the page memory 208 is transformed by the engine interface 501 into serial data so that the serial data is sent to the EXT IN terminal. Control signals are input as serial data, and the control signals are sent to the system bus via the engine interface 501 and the serial interface 502. The page memory 208 has a one-page storage capacity (A3 size). The page memory 208 is used to convert the stored image signals into "bit" image data, and used to adjust the data transmitting speed at the EXT IN and EXT OUT to be in accordance with the CPU processing speed. The enlarging/reducing part 427 is used to perform an enlargement or reduction of the size of the one-page image data stored in the page memory 208 by means of a direct memory controller (DMC) 504. The CEP 505 performs the compression of the image data stored in the page memory 208, or the decompression of compressed image data. Or, the image data from the page memory 208 passes through the CEP 505 without performing the compression or decompression. The bus arbitor connected to the CEP 505 is used to sent data from an advanced graphics display controller (AGDC) 532 shown in FIG. 26 to the image bus or the system bus. The timer 507 generates a prescribed clock signal. The RTC 506 has a clock function and generates a signal indicating the current time.

The rotation control part 503 shown in FIG. 25 performs, for example, a 90-degree rotation of the longitudinally arranged output image data (A$ size) so that a laterally arranged image data (A4 size) is transmitted to an external facsimile unit.

The file unit (APL1) 510 shown in FIG. 24 is an interface device for the floppy disk drive (FDD) 451, the hard disk drive (HDD) 453 and an optical disk drive (ODD) 511. Data is read from the FDD 451, the HDD 453 or the ODD 511 by the file unit 510 via a small computer systems interface (SCSI) 513, and the data is sent from the APL1 510 to the system bus. In a read-only memory (ROM1) 512, a filing system software program for controlling the operations of the FDD 451, the HDD 453 or the ODD 511 when the data is read therefrom is stored.

In the facsimile unit (APL2) 520 shown in FIG. 24, a G4 facsimile control part 521(*a*) supports the protocol of the G4 class I, class II and class III facsimile, and the facsimile data is transmitted to a digital transmission line. A G3 facsimile control part 521(*b*) supports the protocol of the G3 facsimile, and the G3 facsimile protocol from an analog transmission line and the digital signals are converted to analog signals.

A network control unit (NCU) 523 of the facsimile unit 520 controls the connection between the facsimile unit 520 and an external facsimile unit and controls the transmitting and receiving of facsimile data when it is received from or transmitted to the external facsimile unit. The facsimile unit 520 includes a store and forward (SAF) part 524, and the image data or the compressed image data is stored in the SAF part 524 when it is received or transmitted. The SAF part 524 uses a semiconductor memory, a hard disk drive or an optical disk drive. In a read-only memory (ROM2) 525, a software program for controlling the facsimile unit (APL2) 520 is stored. A random-access memory (RAM) 526 is used as a work storage when the operations of the facsimile unit 520 are controlled by the software program in the ROM 525. The RAM 526 is used as a non-volatile storage in which telephone number data, personal name data and facsimile control data are stored. The data stored in the RAM 526 can be set and changed by using touch switches (T/S) and a liquid crystal display (LCD) which are connected to the operation unit 201 shown in FIG. 25. In the operation unit 201 shown in FIG. 25, the LCD displays the graphics and characters, and the touch switch controller (TSC) controls operations of the touch switches (T/S).

The on/off printer unit (APL3) shown in FIG. 26 is an on-line and off-line printer control unit. The floppy disk controller (FDC) 450 controls the floppy disk operations. The serial interface 533 and the centronics interface unit 534 are interface units used for connection to a host computer. An emulation card 535 allows the on-off printer unit (APL3) to execute the procedures provided for another system. The AGDC 532 serves to quickly generate image data in the page memory from the coded data from the host computer and from the font data in either a CG (character generator) ROM 536 or one of CG cards 531. In the CG ROM 536, the font data corresponding to the coded data is stored. In the ROM 537, a software program for controlling the operations of these parts is stored.

The LAN unit (APL4) 540 shown in FIG. 24 is a control unit for a local area network (LAN). The facsimile unit (APL2) 520 and the LAN unit 540 can start operating when the other application units are being operated.

Next, a description will be given of operations of the digital copying apparatus to which the facsimile unit (APL2)

is connected is remote controlled from a telephone unit. FIG. 1 shows a first embodiment of the facsimile unit (APL2) connected to the digital copying apparatus according to the present invention. The operations of the facsimile unit when the digital copying apparatus is remote controlled from an external telephone unit will be now be described.

In the facsimile unit 520 shown in FIG. 1, the SAF part 524 and either of the facsimile control parts 521(*a*) and 521(*b*) are provided as described above. As shown in FIG. 1, a facsimile terminal 560 is connected to a facsimile (FAX) telephone line so that facsimile data is received and transmitted by the facsimile terminal 560 via the facsimile telephone line. This facsimile terminal 560 is connected to the facsimile unit (APL2) 520, so that the facsimile data received from an external facsimile unit is available to the digital copying apparatus through the facsimile unit 520, and that the facsimile data stored in the SAF 524 is transmitted to an external facsimile unit by the facsimile unit 520.

The facsimile control (FAXCNT) part 521 shown in FIG. 1 is connected to a remote-control (R/C) telephone line, and controls the reception and transmission of control signals between the facsimile unit 520 and an external unit via the R/C telephone line. The FAXCNT part 521 is connected to the second CPU 200 via the serial interface, and the second CPU 200 controls the operations of the digital copying apparatus. The FAXCNT part 521 performs the interface procedures between the facsimile unit 520 and the digital copying apparatus.

When image data is read from a scanned document by the scanner (SC) unit of the digital copying apparatus, the image data is stored in the memory of the SAF part 524. The image data is read out from the SAF part 514 by the FAXCNT part 521 and sent to the printer (PR) unit of the digital copying apparatus so that an output image is formed by the image data. In addition, when image data is read from a scanned document by the scanner (SC) unit, the image data is sent to the facsimile terminal 560 so that the image data is transmitted to an external facsimile unit via the FAX telephone line. The facsimile terminal 560 receives image data via the FAX telephone line, and sends the image data to the printer (PR) unit so that an image is formed by the image data. In addition, it is possible that the image data stored in the SAF part 524 is transmitted to an external facsimile unit via the FAX telephone line, and it is possible that the image data received from an external facsimile unit is stored in the SAF part 524.

Figure 5:
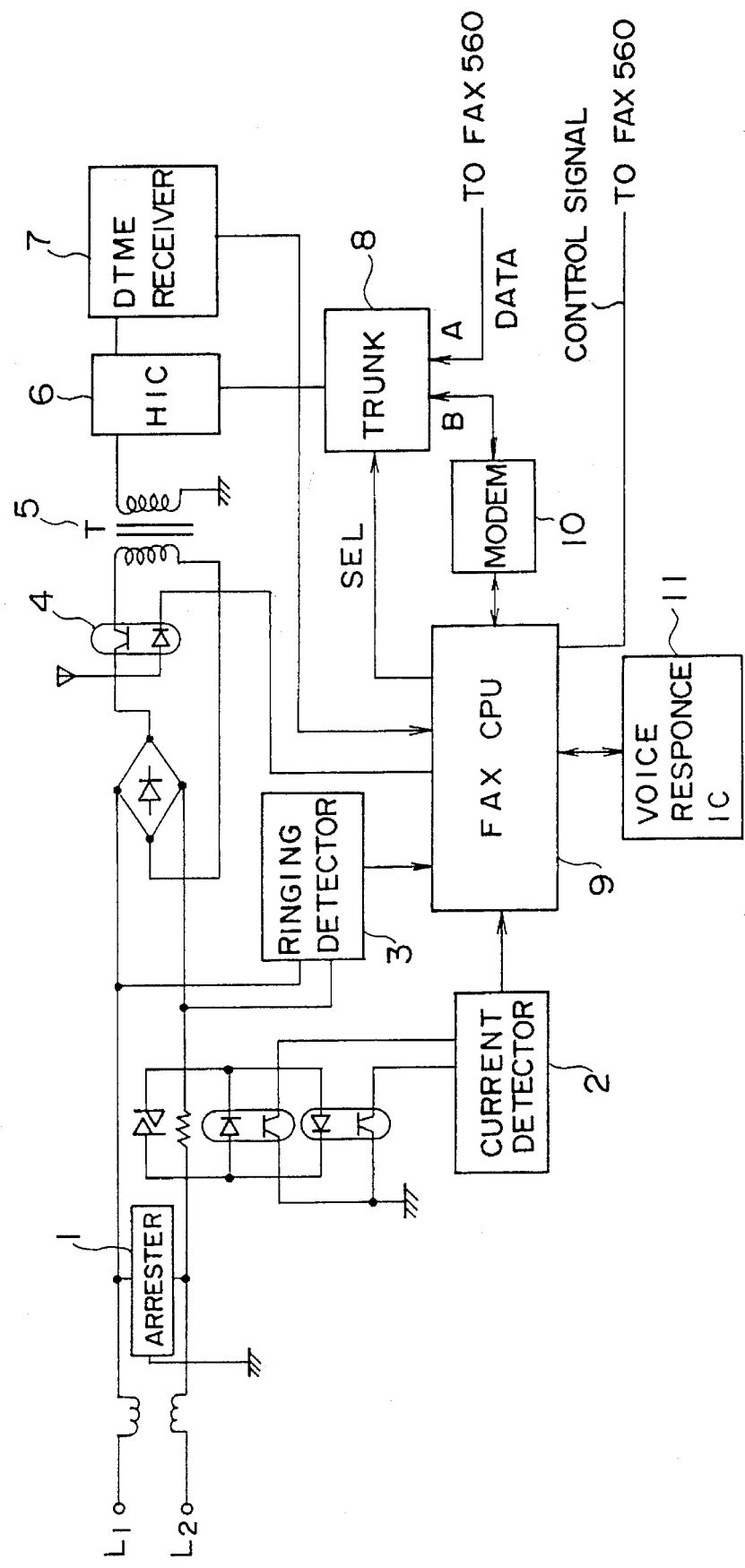
FIG. 5 is a block diagram showing a facsimile controller part of the facsimile unit according to the present invention.

FIG. 5 shows the construction of the facsimile control (FAXCNT) part 521 of the facsimile unit (APL2) 520 according to the present invention. The operations of the FAXCNT part 521 will now be described with reference to FIG. 5. In the FAXCNT part 521 shown in FIG. 5, an arrestor 1 is provided to discharge a defective current to the ground when it occurs in the telephone lines L1 and L2. A current detector 2 is provided to detect inversion of the signals in the telephone lines L1 and L2.

When a ringing signal is sent from an external telephone unit via telephone lines L1 and L2, a ringing detector 3 in the FAXCNT part 521 detects reception of the ringing signal, and sends a detection signal to a facsimile CPU (FAXCPU) 9. In response to the detection signal, the FAXCPU 9 turns on a line connection switch 4 (to the closed condition) so that the telephone lines L1 and L2 are connected to the FAXCNT part 521 at the line connection switch 4. As shown in FIG. 5, the telephone lines L1 and L2 are connected to a trunk 8 via a transformer 5 and a hybrid integrated circuit (HIC) 6 in the FAXCNT part 521. The FAXCPU part 9 at this time sends a selection signal (SEL) to the trunk 8 so that a terminal "A" at the other end of the trunk 8 is selected to connect the telephone lines to the facsimile terminal (FAX) 560 via the trunk 8.

When the telephone lines L1 and L2 are connected to the facsimile terminal 560, the FAXCPU 9 sends back to the external telephone unit a protocol signal CED indicating the receiving unit being a facsimile terminal, and repeats the sending of a set of protocol signals NSF and DIS to the external telephone unit three times until a responding signal is received from the external telephone unit.

Figure 27:
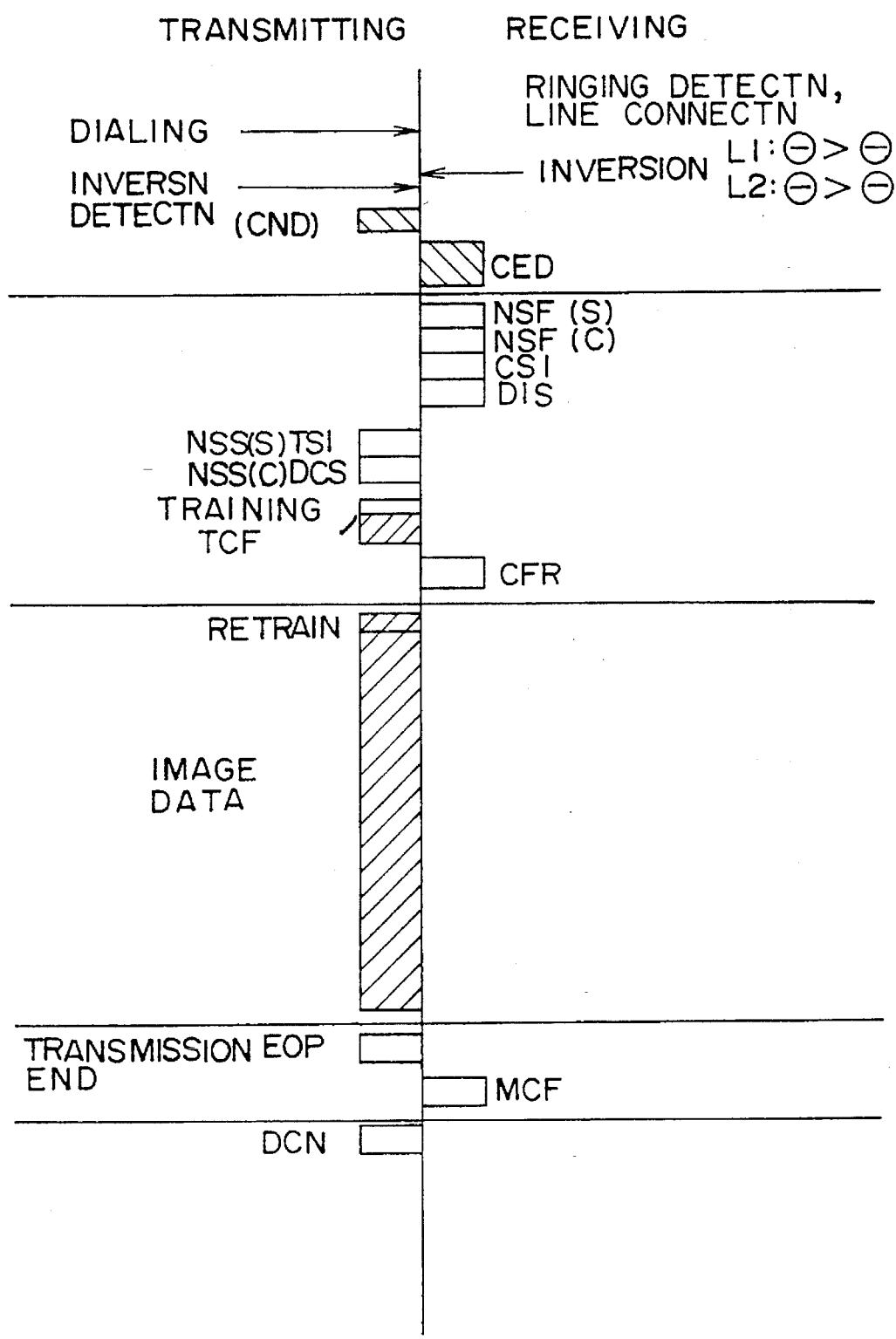
FIG. 27 is a diagram showing protocol signals exchanged between a transmitting unit and a receiving unit, the receiving unit being the facsimile unit according to the present invention.

When the telephone lines L1 and L2 are connected to the facsimile terminal 560, the FAXCPU 9 detects whether or not a protocol signal CNG indicating the external unit being a facsimile terminal is received. If the signal CNG mentioned above is received, the FAXCPU 9 enables the facsimile terminal 560 to receive facsimile data from the external facsimile terminal via the telephone lines after responding signals NSS and DCS are received therefrom. The data received from the external facsimile terminal is sent to the printer (PR) unit so that an image formation is carried out in accordance with the received data. FIG. 27 shows the protocol signals being exchanged between the transmitting unit and the receiving unit, the receiving unit being the facsimile unit of the present invention.

When a signal equivalent to the protocol signal CNG is received from an external telephone unit via the telephone lines, the FAXCPU 9 sends a selection signal SEL to the trunk 8 so that a terminal "B" at the other end of the trunk 8 is selected to connect the telephone lines to a modem 10 via the trunk 8. When a DTMF (dual tone multi-frequency) signal from the external telephone unit is detected by a DTMF receiver 7 of the facsimile control, or when no facsimile protocol signals CNG, NSF and DSC were not received by the FAXCPU 9, the FAXCPU 9 enables the FAXCNT part 521 to be in a ready condition wherein the reception of protocol signals from the external telephone unit is allowed. When the FAXCNT part 521 is in the ready condition mentioned above, the digital copying apparatus can be remote controlled by the protocol signals from the external telephone unit. In the ready condition of the FAXCNT 521, control signals are exchanged between the FAXCPU 9 and the external telephone unit so that the FAXCPU 9 controls operations of the scanner (SC) unit and the printer (PR) unit of the digital copying apparatus and operations of the SAF part 524 of the facsimile unit, in accordance with the protocol signals from the external telephone unit. In the FAXCNT part 521 shown in FIG. 5, when a voice response to the external telephone unit is performed for the purpose of confirmation, a given message data is recorded in a voice response IC 11 of the FAXCNT 521, and a voice signal derived from the recorded message data of the voice response IC 11 is sent back to the external telephone unit by the FAXCPU 9.

After the ringing signal from the external telephone unit is received, the FAXCPU 9 is placed in a condition wherein the reception of a start command for starting the remote control procedure of the digital copying apparatus from the external telephone unit is allowed, while the protocol signals CED, NSF, CSI and DIS are repeatedly sent from the facsimile terminal 560 to the external telephone unit.

If the start command from the external telephone unit is received during the first sending of the protocol signals, the FAXCPU 9 outputs a control signal indicating the reception of the start command to the modem 10 when one second has elapsed since the first sensing of the protocol signals was completed. It is possible that the control signal indicating the reception of the start command is converted into a voice signal by means of the voice response IC 11 before it is sent to the modem 10.

When the control signal mentioned above is received from the FAXCPU 9, the modem 10 transforms the received signal into a DTMF voice signal and this signal is sent to the trunk 8. When the voice signal indicating the reception of the start command is received, the modem 10 sends the received signal to the trunk 8 without transforming the signal. In response to the control signal or the voice signal mentioned above, a signal indicating the completion of reception is sent back to the external telephone unit from the digital copying apparatus.

If the start command is transmitted from the external telephone unit during the second sending of the protocol signals from the facsimile terminal 560, the FAXCPU 9 outputs the control signal or voice signal indicating the reception of the start command to the modem 10 when one second has elapsed since the first sensing of the protocol signals was completed. After the start command from the external telephone unit is received, the FAXCPU 9 outputs a control signal for stopping the subsequent sending of the protocol signal, to the facsimile terminal 560.

Figure 2:
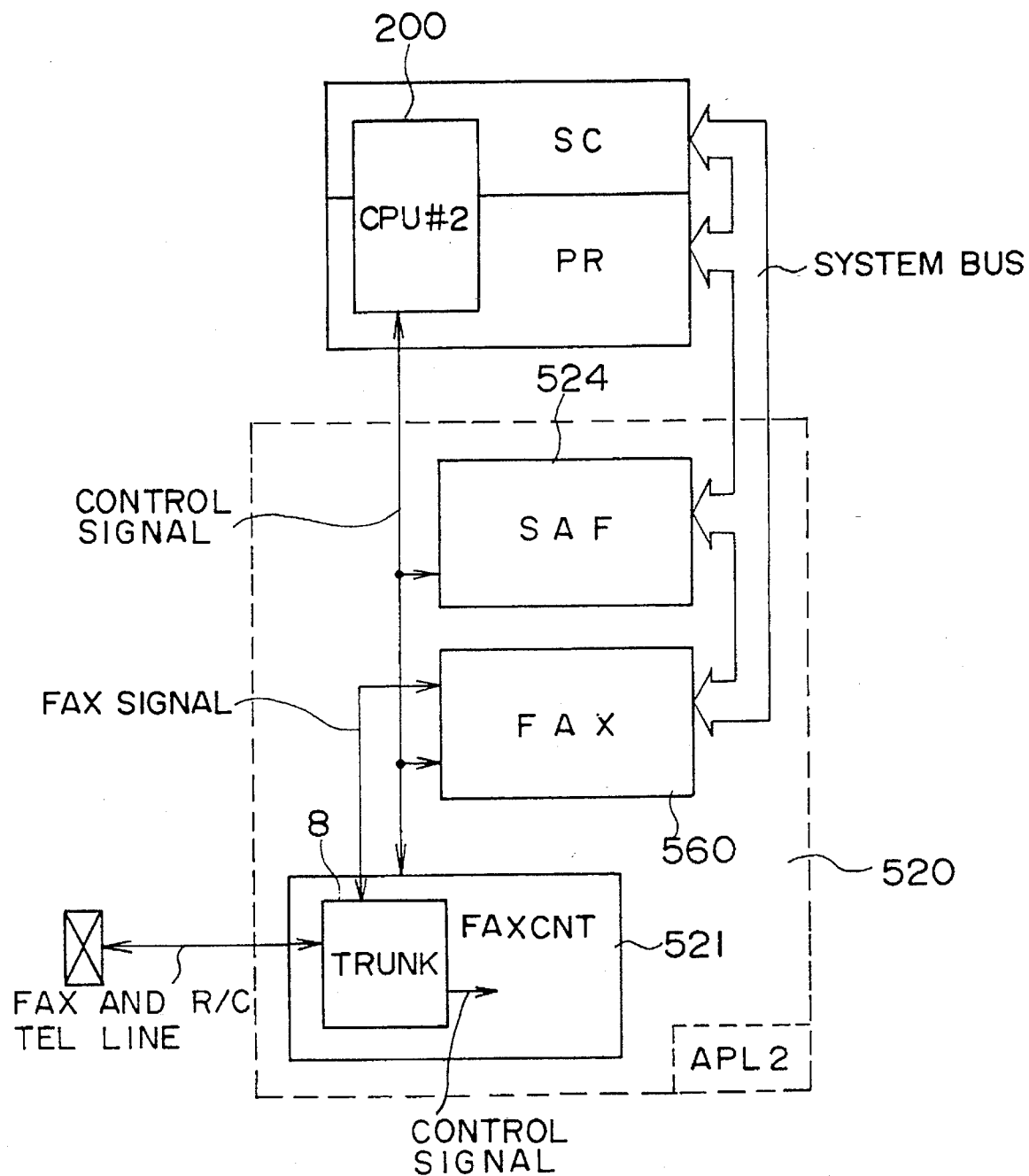
FIGS. 2 through 4 are block diagrams showing other embodiments of facsimile units connected to the remote-controlled copying apparatus according to the present invention.
Figure 3:
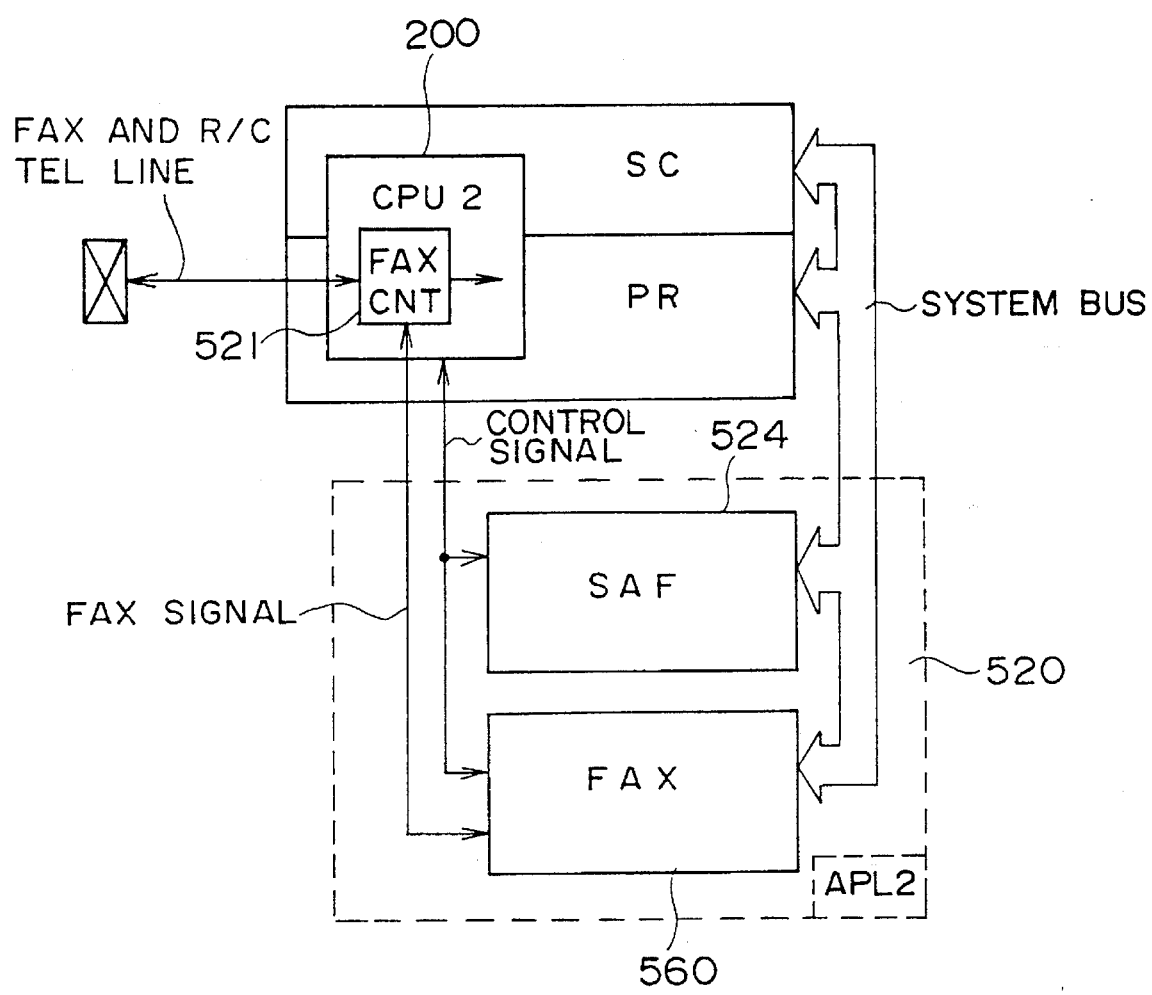
Figure 4:
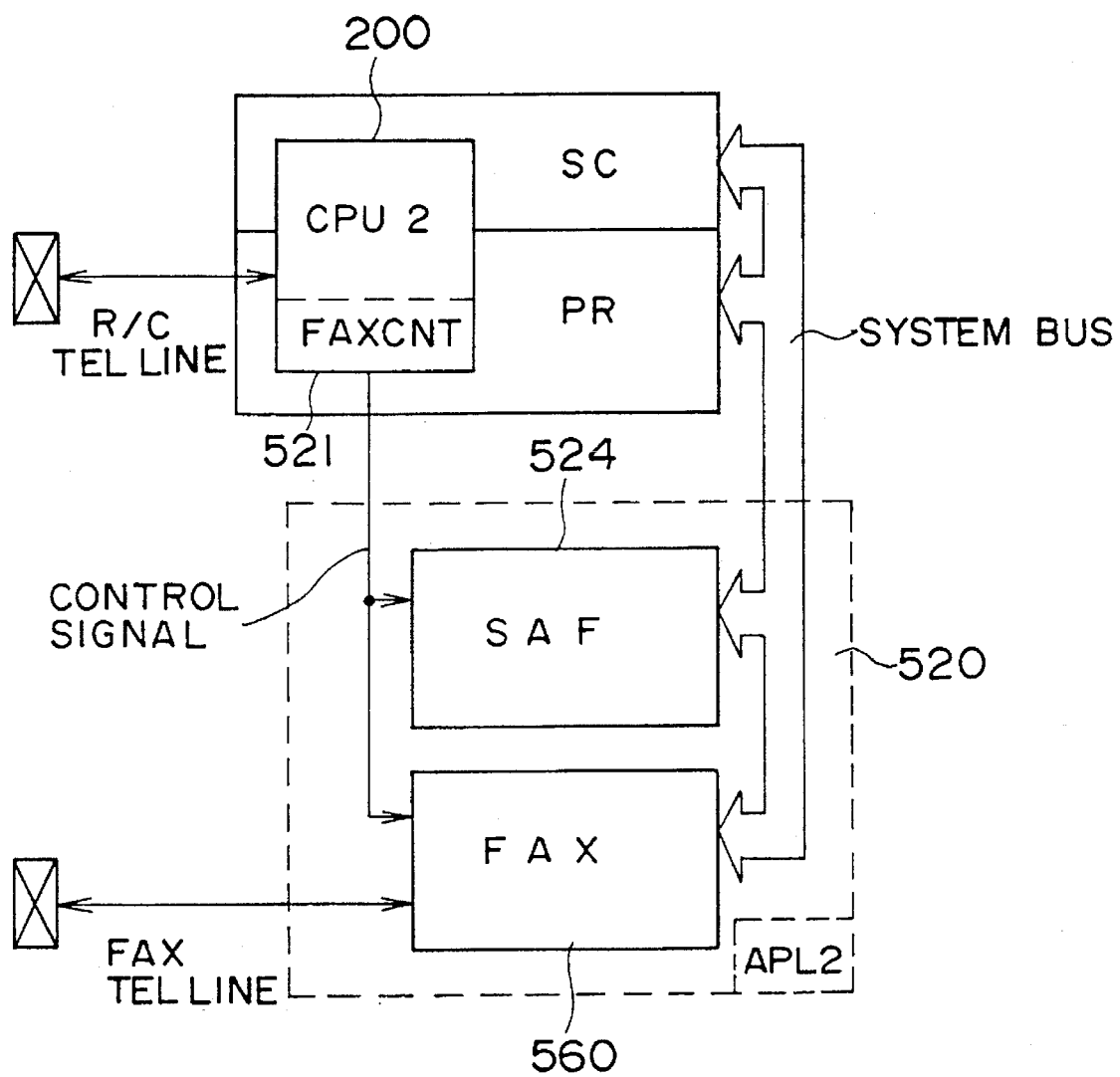

FIGS. 2 through 4 show other embodiments of the facsimile units connected to the remote-controlled digital copying apparatus according to the present invention. In the second embodiment shown in FIG. 2, no facsimile telephone line connected to the facsimile terminal 560 is used, and a common telephone line connected to the trunk 8 of the FAXCNT 521 is used for the remote control and the facsimile control. In the third embodiment shown in FIG. 3, the FAXCNT part 521 is built in the second CPU 200 of the control unit of the remote-controlled digital copying apparatus, and a common telephone line used for the remote control and the facsimile control is connected to the FAXCNT part 521. In the fourth embodiment shown in FIG. 4, the FAXCNT part 521 is built in the second CPU 200, a remote-control (R/C) telephone line is connected to the FAXCNT part 521, and a facsimile telephone line is connected to the facsimile terminal 560 of the facsimile unit 520. When the FAXCNT part 521 is built in the second CPU 200, the construction of the facsimile unit becomes simple.

Next, a description will be given of examples of control signals received at the facsimile unit of the present invention from an external telephone unit in order for remote-controlling the digital copying apparatus. FIG. 28 shows several examples of control signals received at the facsimile unit of the present invention from an external telephone unit.

By depressing twelve different push button keys of a telephone unit, a control signal is transmitted from the telephone unit to the facsimile unit of the present invention. The control signal is formed in accordance with a prescribed format by combinations of the push button keys: ten numeral keys "0"–"9", an asterisk key ",", and a sharp key "#". The control signal is used, for example, to designate a facsimile transmission to the facsimile terminal 560, or to designate a file number of the SAF 524 of the facsimile unit.

The format of each of the control signals shown in FIG. 28 is as follows. Each control signal includes: (1) a desired facsimile function to be executed, (2) a file number of the SAF part 524, (3) a facsimile number of the destination terminal (i.e., the facsimile unit of the present invention), and (4) operation details of the desired function in this order. The desired facsimile function which is the first item of the control signal is indicated by three-digit numbers inserted between the preceding two asterisks "" and the following two asterisks "". Both the file number and the facsimile number are indicated by two-digit numerals inserted between the preceding sharp "#" and the following asterisk "*". The operation details are indicated by three-digit numbers inserted between the preceding "# " and the following two asterisks "**".

For example, the control signal shown in FIG. 28(a) is to designate the facsimile transmission function "110" and to transmit data stored in the file of the SAF part 524 with the file number "45" to the designation terminal indicated by the facsimile number "67".

When it is necessary to transmit a certain confidential data, the control signal must include additional items: a user identification number and a maintenance number. The user identification number in the control signal which appears after the designation facsimile number item is indicated by four-digit numbers inserted between the preceding sharp "#" and the following asterisk "8". The maintenance number appearing after the user identification number is indicated by two-digit numbers inserted between the preceding sharp "#" and the following asterisk ",". FIG. 28 (b) and (c) show such control signals. In the control signal shown in FIG. 28 (c), the user identification number and the maintenance number are followed by the symbols "##*", and the symbols "##*" indicate the appearance of the additional items in the control signal.

FIG. 28 (d) shows a control signal in which a plurality of file numbers of the SAF part 524 are designated. In the control signal shown in FIG. 28 (d), the file numbers "45" and "46" of the SAF part 524 are designated. FIG. 28 (e) shows a control signal in which an error of a designation item is corrected. In the control signal shown in FIG. 28 (e), the file number item "#45*" appearing before the four asterisks "####" is corrected and it is replaced by the following file number item "#46*".

In the above described copying apparatus according to the present invention, it is possible to reliably carry out a remote control procedure of the copying apparatus even when a signal indicating the start of the remote control procedure is received from the telephone unit during the sending of a control signal from the apparatus back to the telephone unit. Also, in the remote-controlled copying apparatus according to the present invention, it is possible that the users can perform simple input operations at a remote telephone unit in order for carrying out a remote control procedure of the copying apparatus.

Further, the present invention is not limited to the above described embodiments, and variations and modifications may be made without departing from the scope of the present invention.

What is claimed is:

1. A remote-controlled copying apparatus comprising:

a scanner unit for reading an image signal;

an image processor for processing the image signal to produce an output image;

a printing unit for printing the output image on a copy sheet;

a storage unit for storing the processed image signal from said image processor;

facsimile means connected to a first telephone line of an external station for receiving an image signal, and for transmitting the processed image signal stored in said storage unit with a protocol signal to the external station via the first telephone line;

facsimile control means connected to a second telephone line of the external station for receiving a tone signal after a ringing signal from the external station is received;

conversion means for converting the tone signal received by said facsimile control means into a control signal, the control signal being supplied to and transmitted by said facsimile control means; and control means for controlling said facsimile control means in accordance with the control signal to carry out a remote control operation, wherein, when the tone signal indicating a request for starting the remote control operation is received during the transmission of the protocol signal, said control means allows said facsimile control means to transmit the control signal to the external station, and wherein said facsimile control means transmits the control signal to the external station after said transmission of the protocol signal has been performed.

2. A remote-controlled copying apparatus according to claim 1, wherein said tone signal from the external station is of a prescribed signal format and includes a command portion which designates a desired remote control operation of said copying apparatus, a first numeral portion which designates a location of image signals to be transmitted from said storage unit, and a second numeral portion which designates a facsimile number of the external station to which the image signals are to be transmitted.

3. A remote-controlled copying apparatus according to claim 2, wherein each of said command portion, said first numeral portion, and said second numeral portion of said first tone signal from the external station is inserted between a prescribed start symbol and a prescribed end symbol.

4. A remote-controlled copying apparatus according to claim 1, wherein each said storage unit and said facsimile control means are mounted on an application unit such that said storage unit and said facsimile means are interconnected by a bus.

5. A remote-controlled copying apparatus according to claim 2, wherein said tone signal includes a plurality of numeral portions designating two or more locations of said storage unit, a first-occurrence numeral portion among said numeral portions being preceded by a prescribed start symbol only, and each of the other numeral portions being inserted between said prescribed start symbol and a prescribed end symbol.

6. A remote-controlled copying apparatus according to claim 1, wherein said storage unit and said facsimile control means are mounted on an application unit such that said storage unit and said facsimile means are interconnected by a bus.

7. A remote-controlled copying apparatus according to claim 6, wherein said facsimile control means is mounted on said application unit such that said facsimile control means is connected to a central processing unit via a serial interface.

8. A remote-controlled copying apparatus according to claim 6, wherein said facsimile control means is connected to a central processing unit via a serial interface.

* * * * *